(12) United States Patent
Abdollahi et al.

(10) Patent No.: US 9,354,447 B2
(45) Date of Patent: May 31, 2016

(54) HEAD MOUNTED INFORMATION SYSTEMS AND RELATED METHODS

(75) Inventors: Hamid Abdollahi, Vancouver (CA); Dan Eisenhardt, Vancouver (CA); Li Chen, Vancouver (CA); David Robertson Lee, North Vancouver (CA)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 13/522,684

(22) PCT Filed: Jan. 18, 2011

(86) PCT No.: PCT/CA2011/050023
§ 371 (c)(1),
(2), (4) Date: Nov. 6, 2012

(87) PCT Pub. No.: WO2011/085501
PCT Pub. Date: Jul. 21, 2011

(65) Prior Publication Data
US 2013/0044043 A1   Feb. 21, 2013

Related U.S. Application Data

(60) Provisional application No. 61/295,976, filed on Jan. 18, 2010.

(51) Int. Cl.
*G02B 27/01* (2006.01)
*A42B 3/04* (2006.01)
(Continued)

(52) U.S. Cl.
CPC ............ *G02B 27/017* (2013.01); *A42B 3/0433* (2013.01); *A63B 71/0619* (2013.01);
(Continued)

(58) Field of Classification Search
CPC .... A63B 69/18; A63B 69/183; A63B 69/187; A63B 2069/185; A63C 2203/18
See application file for complete search history.

(56) References Cited

U.S. PATENT DOCUMENTS

| 4,757,714 | A | 7/1988 | Purdy et al. |
| 5,162,828 | A | 11/1992 | Furness et al. |

(Continued)

FOREIGN PATENT DOCUMENTS

| WO | 2006081317 A2 | 8/2006 |
| WO | 2008027415 A3 | 3/2008 |

OTHER PUBLICATIONS

Chuck Roberts, Beginning Terrain Park Ski Instruction, 2004.*
(Continued)

*Primary Examiner* — Quan-Zhen Wang
*Assistant Examiner* — Dong Hui Liang
(74) *Attorney, Agent, or Firm* — Patent Capital Group

(57) ABSTRACT

A head mounted information system comprises a frame configured to be worn by a user, a sensor unit coupled to the frame, and a processor unit coupled to the frame. The processor unit is connected to receive signals from the sensor unit. The sensor unit comprises a gyroscope configured to produce angular velocity signals representing a head angular velocity about a generally horizontal axis oriented generally perpendicular to a direction the user is facing when the user is wearing the frame. The processor unit is configured to detect a jump by the user based on the angular velocity signals received from the sensor unit and generate a jump output signal indicting one or more jump parameters. A display unit may also be coupled to the frame to display the jump parameters to the user.

37 Claims, 18 Drawing Sheets

(51) Int. Cl.
*A63B 71/06* (2006.01)
*G01C 21/16* (2006.01)
*A63B 69/18* (2006.01)

(52) U.S. Cl.
CPC .......... *A63B71/0622* (2013.01); *G01C 21/165* (2013.01); *A63B 69/18* (2013.01); *A63B 71/0669* (2013.01); *A63B 2071/0666* (2013.01); *A63B 2220/12* (2013.01); *A63B 2220/30* (2013.01); *A63B 2220/34* (2013.01); *A63B 2220/40* (2013.01); *A63B 2220/44* (2013.01); *A63B 2244/19* (2013.01); *A63B 2244/203* (2013.01); *A63C 2203/18* (2013.01); *A63C 2203/24* (2013.01); *G02B 2027/014* (2013.01); *G02B 2027/0187* (2013.01)

(56) References Cited

U.S. PATENT DOCUMENTS

| | | |
|---|---|---|
| 5,960,380 A | 9/1999 | Flentov et al. |
| 5,978,972 A | 11/1999 | Stewart et al. |
| 6,167,356 A | 12/2000 | Squadron et al. |
| 6,441,846 B1 | 8/2002 | Carlbom et al. |
| 6,730,047 B2 | 5/2004 | Socci et al. |
| 6,924,764 B1 | 8/2005 | Chen |
| 7,092,846 B2 | 8/2006 | Vock et al. |
| 7,255,437 B2 | 8/2007 | Howell et al. |
| 7,386,401 B2 | 6/2008 | Vock et al. |
| 2002/0183657 A1* | 12/2002 | Socci et al. .................... 600/595 |
| 2007/0061106 A1* | 3/2007 | Vock et al. .................... 702/182 |
| 2007/0213110 A1* | 9/2007 | Rosenberg ........................ 463/7 |
| 2007/0287596 A1 | 12/2007 | Case, Jr. et al. |
| 2008/0284650 A1* | 11/2008 | MacIntosh et al. ...... 342/357.14 |
| 2009/0326857 A1 | 12/2009 | Mathews et al. |
| 2010/0204615 A1* | 8/2010 | Kyle et al. .................... 600/595 |

OTHER PUBLICATIONS

International Search Report dated Jun. 1, 2011 issued on corresponding application No. PCT/CA2011/050023.
Written Opinion dated Jun. 1, 2011 issued on corresponding application No. PCT/CA2011/050023.
Niklas Hjortsmarker, "Experimental system for validating GPS/INS integration algorithms", 2005:307 CIV-ISSN 1402-1617, pp. 1-92.
Mohinder S. Grewal et al., "Global Positioning Systems Inertial Navigation and Integration", 2d ed, ISBN-13 978-0-470-04190-1.

* cited by examiner

HEAD MOUNTED INFORMATION SYSTEMS AND RELATED METHODS

CROSS-REFERENCE TO RELATED APPLICATION

This application is a National Phase Entry of International Patent Application No. PCT/CA2011/050023, filed 18 Jan. 2011, which claims Paris Convention priority from U.S. Patent Application No. 61/295,976 filed 18 Jan. 2010. For the purposes of the United States of America, this application claims the benefit under 35 U.S.C. §119 and/or 35 U.S.C. §365 of International Patent Application No. PCT/CA2011/050023 filed 18 Jan. 2011 and U.S. Patent Application No. 61/295,976 filed 18 Jan. 2010, both of which are hereby incorporated by reference.

TECHNICAL FIELD

This invention relates generally to head-mounted information systems which provide information to their users. Particular embodiments provide systems and methods for operating such head-mounted systems.

BACKGROUND

Various prior art systems exist for providing skiers, snowboarders and athletes taking part in other sports with information regarding their performance. Many current solutions such as handheld GPS devices, performance measurement units, wristwatches, and mobile phones require the user to stop, and possibly remove gloves, in order to extract the device and look at the information. This can create discomfort, waste time, causes delay and may furthermore be prone to inaccurate measurements.

Many existing electronic performance measurement devices for skiers, snowboarders and other athletes use GPS techniques and require bulky sensor modules mounted at various parts of the user's body. Most of the existing GPS-based devices for skiing and snowboarding have the following limitations: the GPS data is prone to atmospheric delay errors; and while the GPS-based position errors are generally bounded, the GPS signal can be lost when the corresponding satellites are geometrically inaccessible. Most of the available equipment includes one or more sensors attached to the limbs or equipment of the skier that use wireless communication to the main unit. This makes it inconvenient to use and prone to data errors due to interference and signal attenuation. Furthermore, the output displays of current technologies are often very inconvenient to access and lack user-friendly interfaces.

Patents and published applications relating to methods and systems for providing users with performance information, include the following:

International Patent Application Publication No. WO 2008/027415 to Orth et al.
United States Patent Application Publication No. 2007/0287596 to Case, Jr. et al.
U.S. Pat. No. 7,255,437 to Howell et al.
U.S. Pat. No. 7,092,846 to Vock et al.
U.S. Pat. No. 6,924,764 to Chen
U.S. Pat. No. 6,441,846 to Carlbom et al.
U.S. Pat. No. 5,162,828 to Furness et al.
U.S. Pat. No. 4,757,714 to Purdy et al.

The inventors have determined a need for improved methods and systems for providing performance information to users.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect provides a head mounted information system comprising a frame configured to be worn by a user, a sensor unit coupled to the frame, and a processor unit coupled to the frame. The processor unit is connected to receive signals from the sensor unit. The sensor unit comprises a gyroscope configured to produce angular velocity signals representing a head angular velocity about a generally horizontal axis oriented generally perpendicular to a direction the user is facing when the user is wearing the frame. The processor unit is configured to detect a jump by the user based on the angular velocity signals received from the sensor unit and generate a jump output signal indicating one or more jump parameters. A display unit may also be coupled to the frame to display the jump parameters to the user.

Further aspects and details of example embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments of the invention provide systems and methods for interacting with head-mounted information systems having sensing and display systems as well as wired or wireless connectivity to 3rd party devices. Such head-mounted information systems may be implemented in a variety of head-mounted devices, such as, by way of non-limiting example: eyewear or eye protection devices (e.g. goggles, sunglasses and/or the like), helmets (e.g. ski helmets, cycling (including motorcycling) helmets and/or the like) and/or hands-free mobile communication devices (e.g. hands free devices for mobile phones, PDAs, portable music players and/or the like). The head-mounted information system may provide the user with a heads-up display for displaying various parameters in real-time (such as, by way of non-limiting example: position, orientation, time, speed, vertical drop, airtime, spins, etc.). The electronic components of the head-mounted information systems according to some embodiments include a sensor unit, a processor unit, a power unit, and a display unit.

Figure 1:
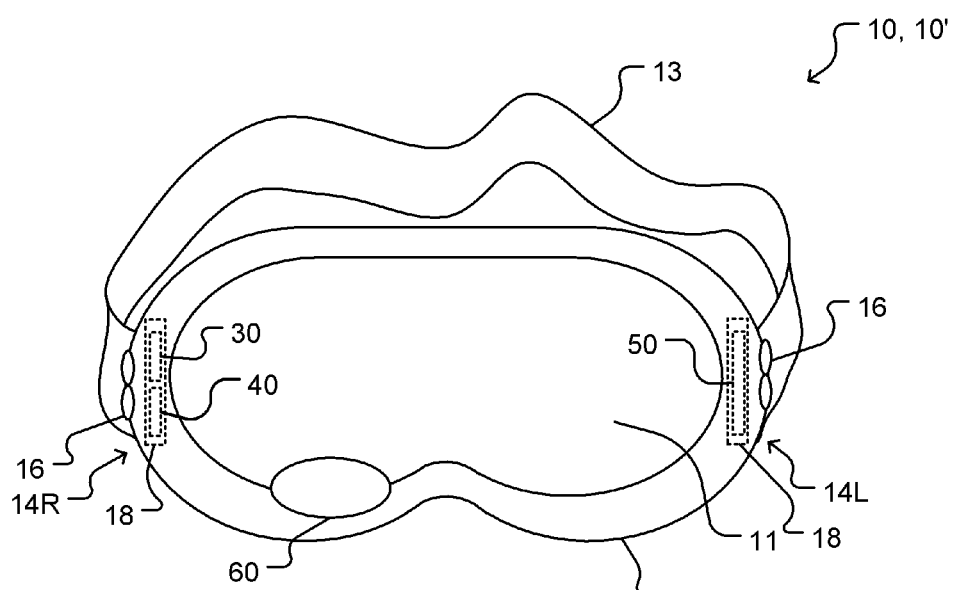
FIG. 1 shows a pair of goggles incorporating a head-mounted information system according to an example embodiment of the invention.

FIG. 1 shows a pair of goggles 10 incorporating a head-mounted information system 10' according to a particular example embodiment of the invention. Goggles 10 may have the features of traditional goggles for a skier, snowboarder or cyclist, for example. Goggles 10 include processing circuitry configured to implement systems and methods according to example embodiments of the invention, as discussed below. Goggles 10 comprise a frame 12 which has an opening for receiving a lens assembly 11. Lens assembly 11 may comprise, for example, a cylindrical dual lens with a silicone seal, with an airtight space between the lenses to reduce fogging. The lenses may both have a 6-inch (15.25 cm) radial base curvature. The lenses may be coated with an anti-fog sealant. The lenses of the illustrated embodiment do not include ventilation holes, but may be ventilated in some embodiments. The lenses may be formed define a recess in order to fit around a display unit 60 (discussed further below). Display unit 60 may be coupled to frame 12 so as to be positioned below a user's right eye when goggles 10 are worn, or at any other convenient location, as discussed further below.

Frame 12 may include a standard ventilation system (not shown) as known in the art. Suitable foam having a thickness of approximately 0.5 inches (1.25 cm) may be attached to the inner rim of frame 12 (i.e., the side which faces the user's face). Thinner foam membranes (several mm thick) may cover all vents on frame 12. Frame 12 may be held in place by a strap 13. Strap 13 may comprise a standard adjustable elastic head strap that can be worn over a helmet (or over a hat, or directly on a user's head) without sliding down or up.

Figure 1A:
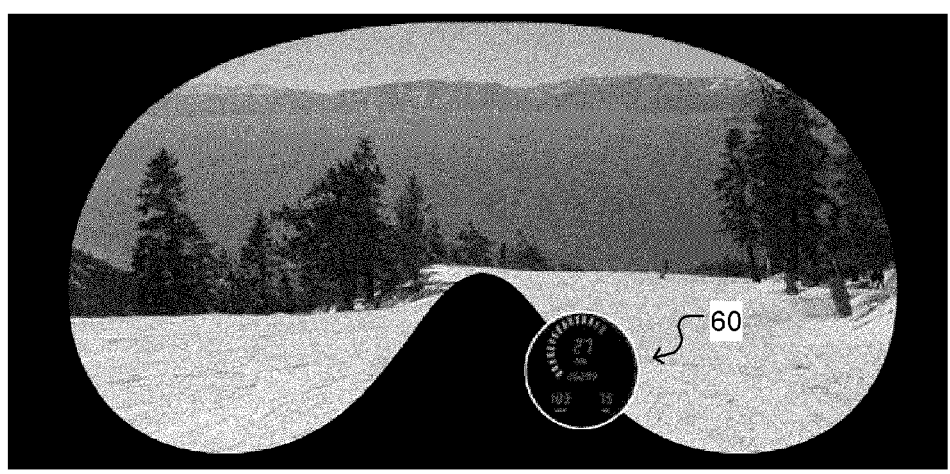
FIG. 1A shows an example view from the goggles of FIG. 1.

Frame 12 has enlarged portions referred to herein as "outriggers" 14 on the left and right sides thereof (individually numbered 14L and 14R, respectively. Outriggers 14 house portions of an electronic system 20 for head-mounted information system 10', as described below with reference to FIG. 2. In the illustrated embodiment, electronic system 20 comprises a sensor unit 30 and a processor unit 40 housed within right outrigger 14R, and a power unit 50 housed within left outrigger. Electronic system 20 also comprises a display unit 60 positioned on frame 12 just below the right eye of a user wearing goggles 10 for providing information to the user. FIG. 1A shows an example view looking out goggles 10 which illustrates an example position of display unit 60. The locations of the components of electronic system 20 may be different in different embodiments. Display unit 60 may be positioned to provide for convenient viewing of display unit 60 without overly interfering with the user's sight lines through the remainder of lens assembly 11. For example, display unit 60 could be positioned below the user's left eye in some embodiments, or may be positioned above or to the side of either eye. Similarly, sensor unit 30, processor unit 40 and power unit 50 may be positioned at any convenient locations within frame 12.

One or more user interface keys 16 may be provided on the sides of frame 12 in some embodiments (two user interface keys 16 are shown on each side of frame 12 in the illustrated embodiment, but a different number of user interface keys could be provided). User interface keys 16 are configured such that they are easily reached by a user and may be tapped or otherwise manipulated while wearing gloves to interact with electronic system 20 of head-mounted information system 10', as described below. In other embodiments, other forms of user-interface components could be provided in addition to or in the alternative to user interface keys 16. Non-limiting examples of such user interface components include: slidable or rotatable user interface components, joystick-type user interface components, optical (e.g. laser or LED-based) user interface components or the like.

In some embodiments, outriggers 14 may comprise flat plastic housings 18 embedded within frame 12 on either side of goggles 10 which house components of electronic system 20. Housings 18 protect components of electrical system 20 from mechanical stresses. Housings 18 may also be watertight in some embodiments to protect components of electrical system 20 from moisture.

In other respects, goggles 10 may have the features of traditional goggles for a skier, snowboarder or cyclist, for example.

Figure 1B:
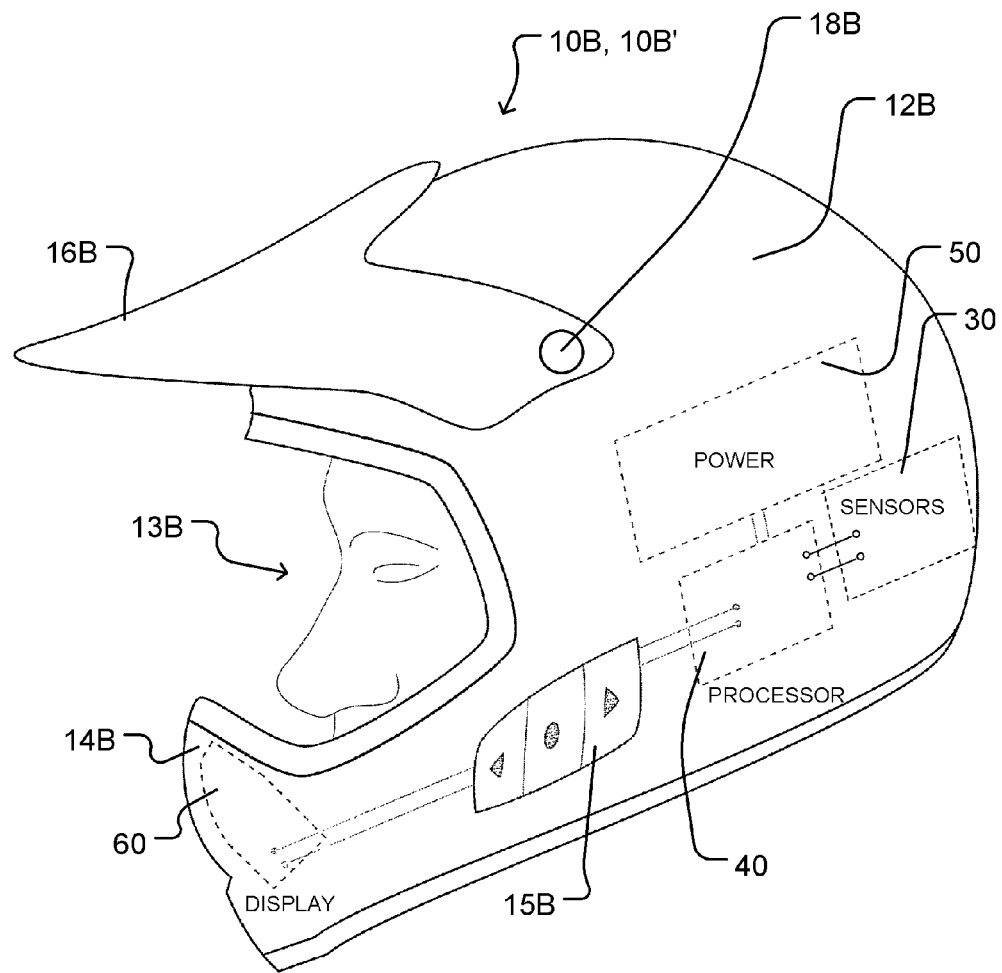
FIG. 1B shows a helmet incorporating a head-mounted information system according to another example embodiment of the invention.

FIG. 1B shows a helmet 10B (e.g. a motorcycle helmet) incorporating a head-mounted information system 10B' according to a particular example embodiment of the invention. Helmet 10B may have the features of traditional helmets for its particular application. For example, where helmet 10B is a motorcycle helmet, it may have the features of traditional motorcycle helmets or where helmet 10B is a skiing helmet, it may have the features of traditional skiing helmets. Helmet 10B includes processing circuitry configured to implement systems and methods according to example embodiments of the invention, as discussed below.

Helmet 10B of the illustrated embodiment, comprises an exterior shell 12B and one or more interior deformable layers (not explicitly enumerated) which define a cavity for accommodating the head of a user. Exterior shell 12B and/or the interior deformable layer(s) may function in manner similar to frame 12 of goggles 10 described herein and may be referred to in some instances as a frame 12B of helmet 10B. In particular embodiments, exterior shell 12B is relatively hard compared to the interior deformable layer(s). In some embodiments, exterior shell 12B and/or the interior deformable layer(s) 10 may themselves comprise multiple layers. In the illustrated embodiment, helmet 10B comprises an optional face-protection element 14B which may be integrally formed with the remainder of helmet 10B or which may be detachably mounted to the remainder of helmet 10B. In the illustrated embodiment, helmet 10B comprises optional eye-protection element (e.g. screen) 16B which may be rotated about pivot joints 18B into an open configuration (shown in FIG. 1B) where eye-protection element is away from face aperture 13B and the user's eyes and into a closed configuration (not shown) where eye-protection element is in front of face aperture 13B and the user's eyes. Eye-protection element 16B may be relatively transparent or may filter light in some respects (e.g. a color filter, a darkening filter, a polarizing filter or the like).

Helmet 10B houses the various components of an electronic system 20 for head-mounted information system 10B', as described below with reference to FIG. 2. In the illustrated embodiment, electronic system 20 comprises a sensor unit 30, a processor unit 40 and a power unit 50 which may be housed between exterior shell 12B and the interior deformable layer(s). In other embodiments, some or all of these components could be mounted on an exterior of exterior shell 12B and could be protected, if desired, by suitably formed enclosures or the like. In still other embodiments, some or all of these components could be otherwise connected to frame 12B of helmet 10B. The locations of the components of electronic system 20 (e.g. sensors 30, processor unit 40, and power unit 50) may be different in different embodiments. In some embodiments, the grouping of the components of electronic system into the schematic components (e.g. sensors 30, processor unit 40, and power unit 50) is not necessary and the locations of these schematic components may be distributed over a plurality of locations in helmet 10B. For example, some components could be on the right side of helmet 10B and others could be on the left side of helmet 10B to maintain balance of helmet 10B.

Electronic system 20 also comprises a display unit 60. In the illustrated embodiment, display unit 60 is located on an interior of face-protection element 14B, where it can be seen by the user when their head is inside helmet 10B, but which allows the user to have a full view out face-aperture 13B. In other embodiments, display unit 60 may be located in other portions of face-protection element 14B. For example, display unit 60 may extend upward from a top of face-protection element 14B and into face aperture 13B to permit the user to more easily see display unit 60. Face-protection element 14B may be modified to house display unit 60 in a manner which facilitates viewing of display unit 60 by the user when helmet 10B is being worn.

In other embodiments, display unit 60 may be located in eye-protection element 16B. In such embodiments, the particular location of display unit 60 in eye-protection element 16B may be selected to allow user to easily see display unit 60 while minimizing the interference of the user's vision through face aperture 13B. In particular, the locations of display unit 60 may be similar to any of the locations described above for display unit 60 within goggles 10.

Figure 1C:
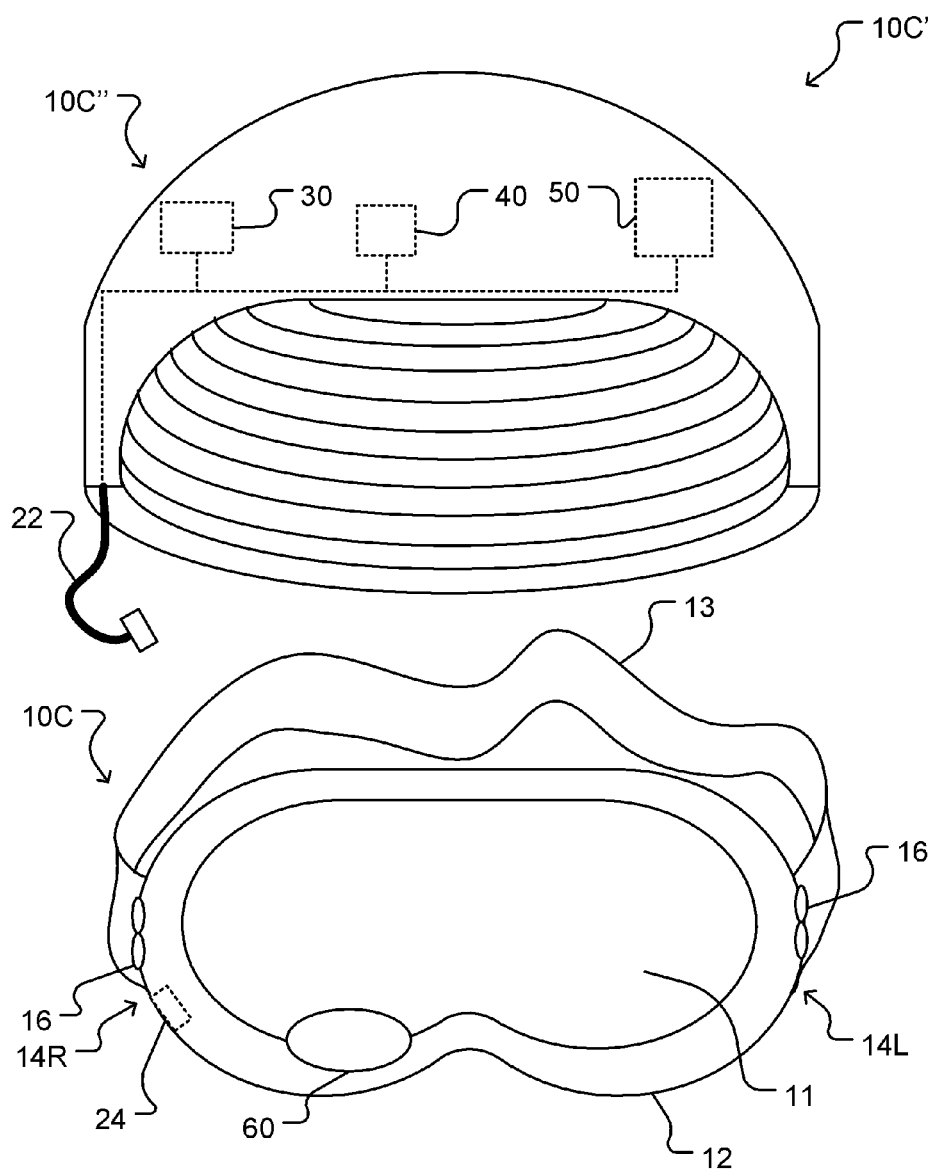
FIG. 1C shows a pair of goggles and a helmet which together incorporate a head-mounted information system according to another example embodiment of the invention.

In other embodiments, helmet 10B may be used in conjunction with goggles, in which case helmet 10B may house some of the components of electronic system 20 (e.g. sensors 30, processor unit 40, and power unit 50) and display unit 60 may be located in the goggles in a manner similar to display unit 60 of goggles 10 described above. In still other embodiments, helmet 10B may be used in conjunction with goggles and the components of electronic system 20 (e.g. sensors 30, processor unit 40, and power unit 50) and display unit 60 may be distributed over suitable locations in helmet 10B and/or goggles 10. For example, FIG. 1C shows a pair of goggles 10C and a helmet 10C" incorporating a head-mounted information system 10C'. Helmet 10C" will typically include a chin strap (not shown) and other features of traditional helmets. In the FIG. 1C embodiment, display unit 60 and user interface keys 16 are located in goggles 10C and sensor unit 30, processor unit 40 and power unit 50 are located in helmet 10C", and goggles 10C and helmet 10C" together provide the frame for head-mounted information system 10C'. A connector 22 extending from helmet 10C" is configured to be received in a receptacle 24 in goggles 10C to provide connectivity sensor unit 30, processor unit 40 and power unit 50 in helmet 10C" and display unit 60 and user interface keys 16 in goggles 10C. Connector 22 and receptacle 24 may be provided with protective coverings (not shown) when not in use.

In the illustrated embodiment of FIG. 1B, head-mounted information system 10B' of helmet 10B comprises a plurality of user-interface components 15B (e.g. buttons 15B). A user may interface with head-mounted information system 10B' using user-interface components 15B in a manner similar to the user interaction with user-interface keys 16 on goggles 10 described herein. Similar user-interface components could also be provided in helmet 10C" of FIG. 1C.

In other respects, helmet 10B may have the features of a traditional helmet (e.g. for a cyclist, skier or motorcyclist).

Figure 1D:
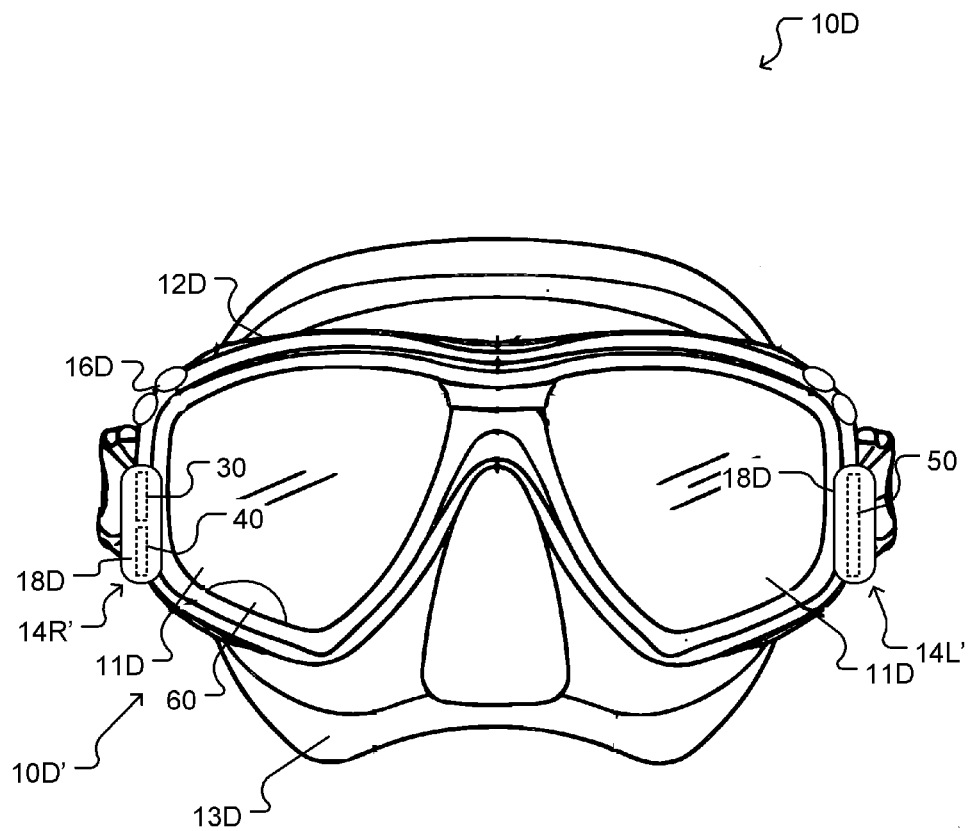
FIG. 1D shows an underwater mask incorporating a head-mounted information system according to an example embodiment of the invention.

FIG. 1D shows an underwater mask 10D incorporating a head-mounted information system 10D' according to a particular example embodiment of the invention. Mask 10D may have the features of traditional underwater mask for a SCUBA diver or snorkeler, for example. Mask 10D includes processing circuitry configured to implement systems and methods according to example embodiments of the invention, as discussed below. In the illustrated embodiment, mask 10D comprises a frame 12D which has openings for receiving lens assemblies 11D and 11D'. In other embodiments, mask 10D could comprise a single lens assembly. Lens assemblies 11D and 11D' may be coated with an anti-fog sealant. Either or both of the lens assemblies 11D and 11D' may be formed to define a recess in order to fit around a display unit 60 (discussed further below). Display unit 60 may be coupled to frame 12D so as to be positioned below a user's right eye when mask 10D is worn, or at any other convenient location, as discussed further below.

Frame 12D and/or lenses 11D and 11D' may include a standard ventilation system (not shown) as known in the art. A suitable elastic membrane (e.g., made of rubber or the like) 13D is attached to the inner rim of frame 12D (i.e., the side which faces the user's face). Frame 12D may be held in place by a strap (not shown), which may comprise a standard adjustable elastic head strap that can be worn directly on a user's head (or over a helmet) without sliding down or up.

Frame 12D has enlarged portions referred to herein as "outriggers" 14' on the left and right sides thereof (individually numbered 14L' and 14R', respectively). Outriggers 14' house portions of an electronic system 20 for head-mounted information system 10D', as described below with reference to FIG. 2. In the illustrated embodiment, electronic system 20 comprises a sensor unit 30 and a processor unit 40 housed within right outrigger 14R', and a power unit 50 housed within left outrigger 14L'. Electronic system 20 also comprises a display unit 60 positioned on frame 12D just below the right eye of a user wearing mask 10D for providing information to the user. The locations of the components of electronic system 20 may be different in different embodiments. Display unit 60 may be positioned to provide for convenient viewing of display unit 60 without overly interfering with the user's sight lines through the remainder of lens assembly 11D. For example, display unit 60 could be positioned below the user's left eye in some embodiments, or may be positioned above or to the side of either eye. Similarly, sensors unit 30, processor unit 40 and power unit 50 may be positioned at any convenient locations within frame 12D.

One or more user interface keys 16D may be provided on the sides of frame 12D in some embodiments (two user interface keys 16D are shown on each side of frame 12D in the illustrated embodiment, but a different number of user interface keys could be provided). User interface keys 16D are configured such that they are easily reached by a user and may be tapped or otherwise manipulated while wearing gloves to interact with electronic system 20 of head-mounted information system 10D', as described below. In other embodiments, other forms of user-interface components could be provided in addition to or in the alternative to user interface keys 16D. Non-limiting examples of such user interface components include: slidable or rotatable user interface components, joystick-type user interface components, optical (e.g. laser or LED-based) user interface components or the like.

In some embodiments, outriggers 14' may comprise flat plastic housings 18D embedded within frame 12D on either side of mask 10D which house components of electronic system 20. Housings 18D protect components of electrical system 20 from mechanical stresses. Housings 18D are also water-tight to protect components of electrical system 20 when underwater.

Figure 1E:
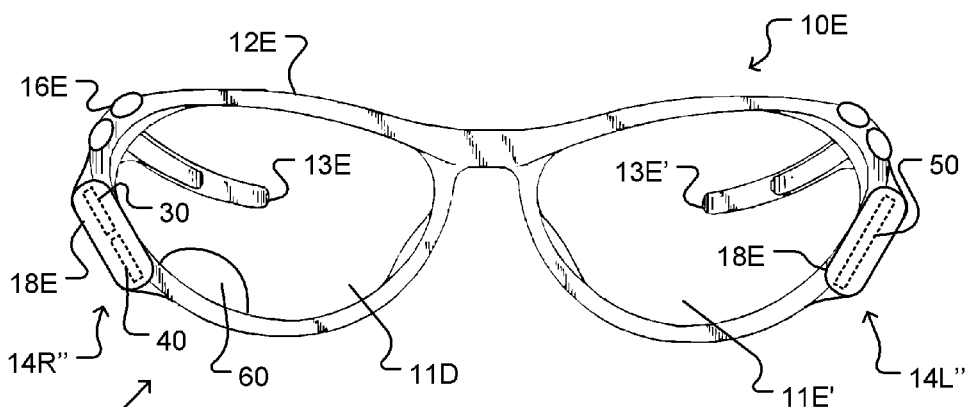
FIG. 1E shows a pair of sunglasses incorporating a head-mounted information system according to an example embodiment of the invention.

FIG. 1E shows a pair of sunglasses 10E incorporating a head-mounted information system 10E' according to a particular example embodiment of the invention. Sunglasses 10E may have the features of traditional sunglasses useful for driving, sporting activities or leisure, for example. As one skilled in the art will appreciate, head-mounted information system 10E' could also be incorporated into types of glasses other than sunglasses, such as, for example, prescription glasses, untinted glasses, safety glasses, etc. Sunglasses 10E include processing circuitry configured to implement systems and methods according to example embodiments of the invention, as discussed below. Sunglasses 10E comprise a frame 12E which has openings for receiving lens assemblies 11E and 11E'. Lens assemblies 11E and 11E' may be formed to define a recess in order to fit around a display unit 60 (discussed further below). Display unit 60 may be coupled to frame 12E so as to be positioned below a user's right eye when sunglasses 10E are worn, or at any other convenient location, as discussed further below.

Frame 12E may be held in place by arms 13E and 13E', and, optionally, a strap or other additional securing means (not shown).

Frame 12E has enlarged portions referred to herein as "outriggers" 14" on the left and right sides thereof (individually numbered 14L" and 14R", respectively). In some embodiments, outriggers are located on arm 13E and/or arm 13E'. Outriggers 14" house portions of an electronic system 20 for head-mounted information system 10E', as described below with reference to FIG. 2. In the illustrated embodiment, electronic system 20 comprises a sensor unit 30 and a processor unit 40 housed within right outrigger 14R", and a power unit 50 housed within left outrigger 14L". Electronic system 20 also comprises a display unit 60 positioned on frame 12E just below the right eye of a user wearing sunglasses 10E for providing information to the user. The locations of the components of electronic system 20 may be different in different embodiments. Display unit 60 may be positioned to provide for convenient viewing of display unit 60 without overly interfering with the user's sight lines through the remainder of lens assembly 11E. For example, display unit 60 could be positioned below the user's left eye in some embodiments, or may be positioned above or to the side of either eye.

Similarly, sensors unit 30, processor unit 40 and power unit 50 may be positioned at any convenient locations within frame 12E and/or arm 13E and/or arm 13E'.

One or more user interface keys 16E may be provided on the sides of frame 12E and/or arm 13E and/or arm 13E' in some embodiments (two user interface keys 16E are shown on each side of frame 12E in the illustrated embodiment, but a different number of user interface keys could be provided). User interface keys 16E are configured such that they are easily reached by a user and may be tapped or otherwise manipulated while wearing gloves to interact with electronic system 20 of head-mounted information system 10E', as described below. In other embodiments, other forms of user-interface components could be provided in addition to or in the alternative to user interface keys 16E. Non-limiting examples of such user interface components include: slidable or rotatable user interface components, joystick-type user interface components, optical (e.g. laser or LED-based) user interface components or the like.

In some embodiments, outriggers 14" may comprise flat plastic housings 18E embedded within frame 12E on either side of sunglasses 10E which house components of electronic system 20. Housings 18E protect components of electrical system 20 from mechanical stresses. Housings 18E may also be water-tight in some embodiments to protect components of electrical system 20 from moisture.

In other respects, sunglasses 10E may have the features of traditional sunglasses useful for driving, sporting activities or leisure, for example.

Figure 2:
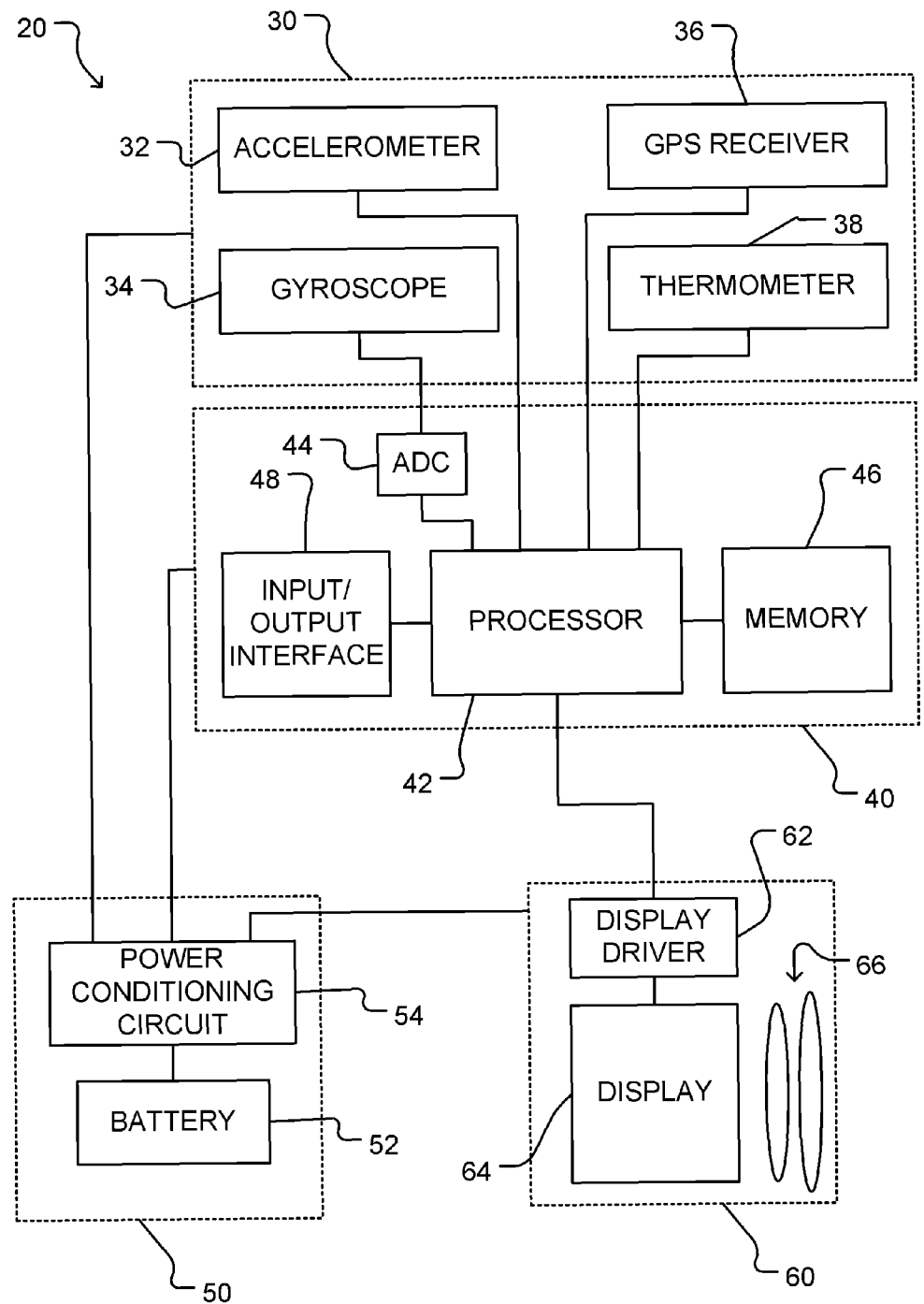
FIG. 2 schematically illustrates an electronic system suitable for use with the head-mounted information system of the FIG. 1 goggles, the FIG. 1B helmet, or the FIG. 1C goggles and helmet.

FIG. 2 shows an example electronic system 20 suitable for use with head-mounted information systems as described above with respect to FIGS. 1 to 1E according to one example embodiment of the invention. As discussed above, electronic system 20 comprises sensor unit 30, processor unit 40, power unit 50 and display unit 60. It will be appreciated that goggles 10 and helmet 10B represent non-limiting examples of devices that may incorporate head-mounted display systems incorporating electronic system 20. In other embodiments, head-mounted information systems may be provided in a variety of head-mounted devices, such as, by way of non-limiting example: other types of eyewear or eye protection devices (e.g. sunglasses, protective glasses or the like), other types of helmets (e.g. ski helmets, snowmobiling helmets or the like) and/or hands-free mobile communication devices (e.g. hands free devices for mobile phones, PDAs, portable music players or the like).

Wiring connecting units 30, 40, 50 and 60 may be enclosed within channels formed in frame 12/12D/12E (in the case of goggles 10, mask 10D or glasses 10E), between exterior shell 12B and the deformable interior layer (in the case of helmet 10B), or may be enclosed within a separate casing (not shown). In embodiments of goggles 10 where sensor unit 30 and processor unit 40 are located in right outrigger 14R, power unit 50 is located in left outrigger 14L, and display unit is located below the user's right eye, power wiring connecting sensor, processor and display units 30, 40 and 60 to power unit 50 may be routed across the upper portion or "bridge" of frame 12, with the power wiring for display unit 60 continuing on around the lower right rim of frame 12. Similarly wiring connecting processor unit 40 to display unit 60 for providing image signals to display unit may be routed around the lower right rim of frame 12. In embodiments of helmet 10B where face-protection element 14B is detachable, the wiring to display unit 60 may comprise detachable wiring connections (e.g. plugs). In embodiments of helmet 10B where display unit 60 is located in eye-protection element 16B, the wiring to display unit 60 may be routed through one or both pivot joints 18B. In embodiments such as shown in FIG. 1C, wiring may be routed through connector 22 and receptacle 24, and through appropriate portions of goggles 10C and helmet 10C".

In the illustrated embodiment, sensor unit 30 comprises a 3-axis accelerometer 32, a 3-axis gyroscope 34, a GPS receiver 36, and a thermometer 38. Accelerometer 32 and gyroscope 34 are collectively referred to herein as "INS" (inertial navigation system) sensors. The INS sensors 32, 34 and GPS receiver 36 have complementary strengths and weaknesses such that their combined use provides for improved reliability and accuracy of measurement of position and altitude as compared to each sensor on its own. Examples of such complementary strengths and weaknesses are described, for example, in "Experimental system for validating GPS/INS integration algorithms", Niklas Hjortsmarker, ISSN 1402-1617, and "Global Positioning Systems Inertial Navigation And Integration", 2nd edition, Mohinder S. Grewal et all, ISBN-13 978-0-470-04190-1, which are hereby incorporated by reference herein.

Accelerometer 32 may comprise, for example, a micro-electro-mechanical system (MEMS) device which produces digital output signals representative of linear accelerations along three perpendicular axes. In some embodiments, accelerometer 32 may comprise a LIS331DL motion sensor manufactured by STMicroelectonics.

Gyroscope 34 may comprise, for example, two MEMS devices, one of which produces analog output signals representative of angular velocities about two perpendicular axes, and one of which produces an analog output signal about a third axis perpendicular to the other two axes. In some embodiments, gyroscope 34 may comprise an IDG-500 for measuring angular velocities about an x-axis and a y-axis, and an ISZ-500 for measuring angular velocity about a z-axis, both of which are manufactured by InvenSense, Inc.

GPS receiver 36 may comprise, for example a Wide Area Augmentation System (WAAS) enabled GPS receiver with a built-in system clock. GPS receiver 36 may, for example, output digital signals using a protocol such as NMEA 0183 or NMEA 2000. Thermometer 38 may comprise, for example, a digital thermometer.

Processor unit 40 comprises a processor 42 which is connected to receive signals from accelerometer 32, gyroscope 34, GPS receiver 36 and thermometer 38 of sensor unit 30. Processor unit 40 may comprise an analog-to-digital converter (ADC) 44 connected between processor 42 and any of the sensors of sensor unit 30 which produce analog signals. In the illustrated embodiment, all sensors of sensor unit 30 except gyroscope 34 have digital outputs, so ADC 44 is connected only between gyroscope 34 and processor 42.

In the illustrated embodiment, processor unit 40 also comprises a memory 46 and an input/output interface 48. Memory 46 has stored therein various computer readable instructions for use by processor 42. In other embodiments, memory 46 may be integrated into processor 42. Input/output interface 48 is configured to support various communications protocols such as, for example, Bluetooth and/or USB, to allow processor 42 to communicate with other devices such as mobile phones and personal computers. Input/output interface 48 may also be configured to receive signals produced when a user interfaces with user interface keys 16 to allow the user to interact with processor 42. In other embodiments, input/output interface 48 may be integrated into processor 42.

Processor 42 is configured to transform signals received from sensor unit 30 to produce outputs representing various parameters relating to user performance, and other outputs, as discussed below. For example, processor 42 may produce outputs relating to position, orientation, time, speed, direction of travel, altitude, vertical drop, jump airtime, jump distance, spins, etc. Processor 42 may store the outputs and/or any other data in memory 46. Processor 42 may also transfer the outputs and/or any other date to another device through input/output interface 48. Processor 42 also produces a video signal 61 defining an image to be displayed and provides video signal 61 to display unit 60. The content of video signal 61 may be controlled by the user interfacing with user interface keys 16, or by another electronic device interacting with processor 42 through input/output interface 48.

Power unit 50 comprises a battery 52 and a power conditioning circuit 54. Power conditioning circuit 54 receives electrical power from battery 52 and outputs electrical power at voltages and/or currents suitable for the various components of sensor unit 30, processor unit 40, and display unit 60.

Display unit 60 comprises a display driver 62 connected to receive video signal 61 from processor 42. Display driver 62 is configured to generate driving signals based on video signal 61, and to provide the driving signals to a display 64. Display 64 may comprise, for example, a QVGA having a 320×240 resolution and 16 bit colors. In some embodiments, display 64 may comprise, a micro LCD illuminated by a suitable backlight. In other embodiments, other types of displays may be used, such as, for example, LED or OLED displays, electroluminescent (EL) displays, or the like. Display 64 is configured to project the image defined by video signal 61 from processor 42. Display unit 60 may also comprise a display lens assembly 66 positioned to received the image projected by display 64. Display lens assembly 66 may be configured to enlarge the projected image and/or to focus the projected image for convenient viewing by a user.

Display unit 60 may be housed within a removable casing (not shown). Such a removable casing may be detachably received within a complementary-shaped recess in frame 12 (in the case of goggles 10) or between exterior shell 12B and the interior deformable layer (in the case of helmet 10B). The casing for display unit 60 may comprise a box-type or "clam shell"-type construction having a lower half and an upper half which may be opened (e.g. for access) or closed (e.g. to form a watertight enclosure). A separate moisture sealing gasket may be mounted between the two halves before they are closed (e.g. snapped and/or screwed together) to form a moisture tight enclosure. The casing may define a series of compartments each designed to individually secure a display module, display back light, display lens and electrical connections. The casing may be held in place within a complementary recess by the walls of the recess itself, along with hooks and/or snaps or the like which may be molded into, or otherwise provided, on mating surfaces of the casing and/or the recess. The casing may additionally be held in place by screws coupleable to the exterior casing walls.

As one skilled in the art will appreciate based on the foregoing description, head-mounted information systems according to certain embodiments of the invention may be provided in a variety of different head-mounted devices (e.g. eyewear, helmets, mobile communication devices and the like). In the following description, exemplary embodiments of the control of head-mounted information systems are described in the context of head-mounted display system 10' of goggles 10 shown in the illustrated example embodiment of FIG. 1 without loss of generality. It will be understood that the description provided herein is applicable in a similar manner (with suitable modification) to the control of head-mounted information systems provided in helmets (e.g. helmet 10B) or in other head-mounted devices.

In some embodiments, electronic system 20 of head-mounted information system 10' of goggles 10 may be turned on and off using a user-interface key on the frame of the goggles or by tapping one of the outriggers of the frame. Once the electronic system is powered on, the default view appears in the display showing information relating to the user's activity. The user can switch between views by pressing or otherwise interacting with user interface keys on the frame or by tapping one of the outriggers of the frame. The user can customize his or her own view(s) by connecting the head-mounted information system to a personal computer or other external device. Each view may be tailored to a particular activity to provide suitable information with a minimum requirement for user interaction during the activity. For example, during jumps in a fun-park, the user may select a jump view to display information such as jump airtime and distance. Similarly, if the activity is downhill skiing then a downhill view may be selected to show speed, distance, and optionally altitude. Information which is independent of the activity such as temperature, time, and text/call info may always be shown, but the display of such additional information is up to the user to decide and configure. Furthermore, the electronic system of the head-mounted information system may be configured to accept Bluetooth and other communication protocols, which allow for mobile text messages and call info to be received and displayed to the user at any time, depending on user preference. Staying connected while performing activities has many benefits. By way of non-limiting example, staying connected can be desirable on the ski mountain, where coordination of activities such as lift access, refreshments, and meeting places is part of the daily rhythm. Another benefit provided by some embodiments is safety—with the push of a user interface key, GPS coordinates may be sent to ski patrol for fast rescue in an emergency. Also, the USB integration enables users to upload data from their head-mounted information system to a personal computer or other external device to track performance and to compare results with others (e.g. other riders and skiers within an online community). By way of example only, the online community could feature way-point download for those desired off-path sights as well as air-time (jumps) rankings and prizes.

Certain embodiments provide head-mounted information systems, such as, for example system 10', 10B', 10C', 10D' or 10E' described above, which are configured to detect jumps performed by a user. Such systems may determine various jump parameters from outputs from the sensor units, and may provide users with information about the jump parameters through the display units. Other embodiments provide head-mounted information systems which include only a subset of the elements of systems 10', 10B', 10C', 10D' and 10E'. For example, some embodiments provide head-mounted information systems which detect jumps and determine jump parameters based only on outputs from a single axis gyroscope. Other embodiments provide head-mounted information systems which detect jumps and determine jump parameters based on outputs from a single axis gyroscope in combination with a GPS receiver and/or one or more accelerometers. Such embodiments may include a display, or may provide output signals to a separate display or other output device for providing users with jump information.

When a skier, snowboarder, biker, or other athlete is about to execute a jump, the athlete usually crouches his or her legs or otherwise lowers his or her center of gravity in order to prepare to pushoff. Such behavior causes rotation of the upper body. Also, when the athlete lands, the impact of such landing will cause vibration of the head and/or upper body. The inventors have determined that a head-mounted single-axis gyroscope configured to measure angular velocity about a generally horizontal axis (which may be referred to herein as the "z-axis") oriented generally perpendicular to a direction the athlete is facing (e.g., generally parallel to a line extending between the athlete's ears) may be used to detect the occurrence of a jump and determine one or more jump parameters.

Figure 3A:
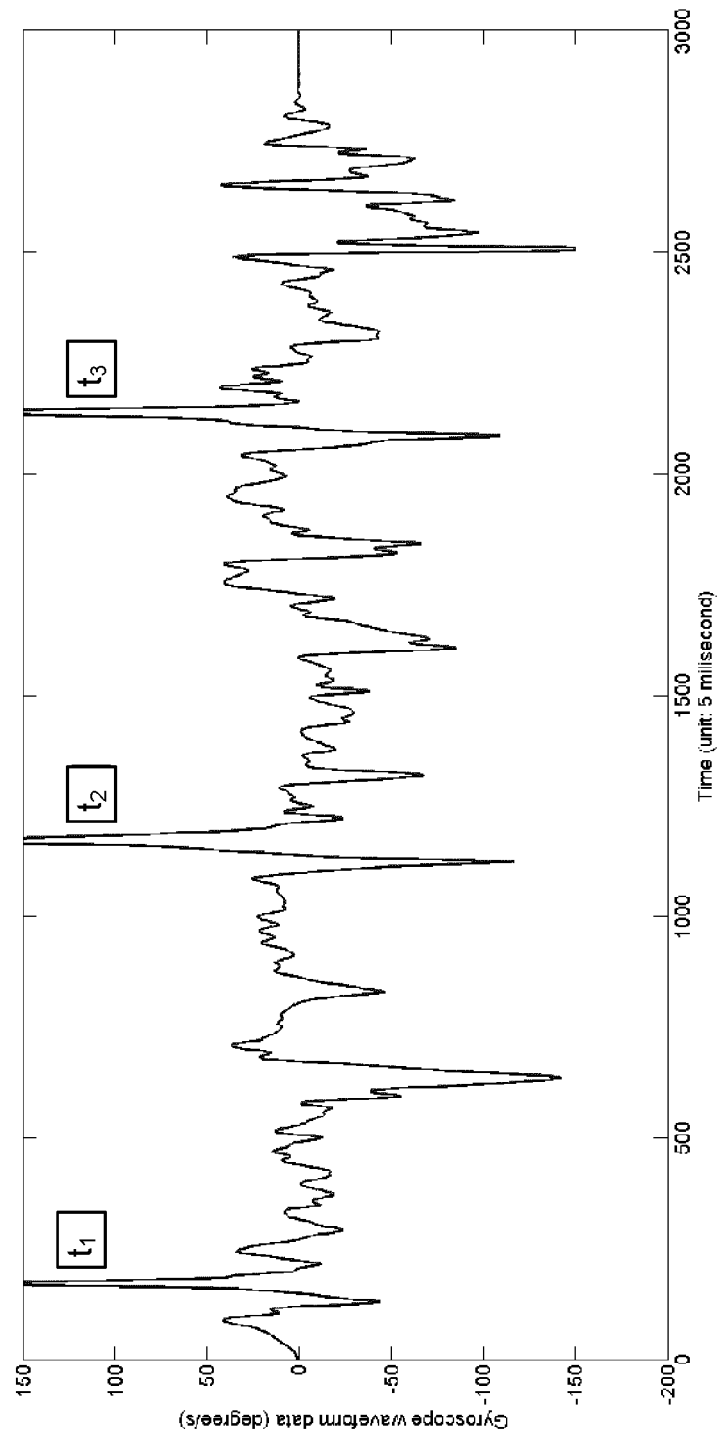
FIG. 3A is a graph showing an example output signal from a head-mounted gyroscope during three jumps by a user.
Figure 3B:
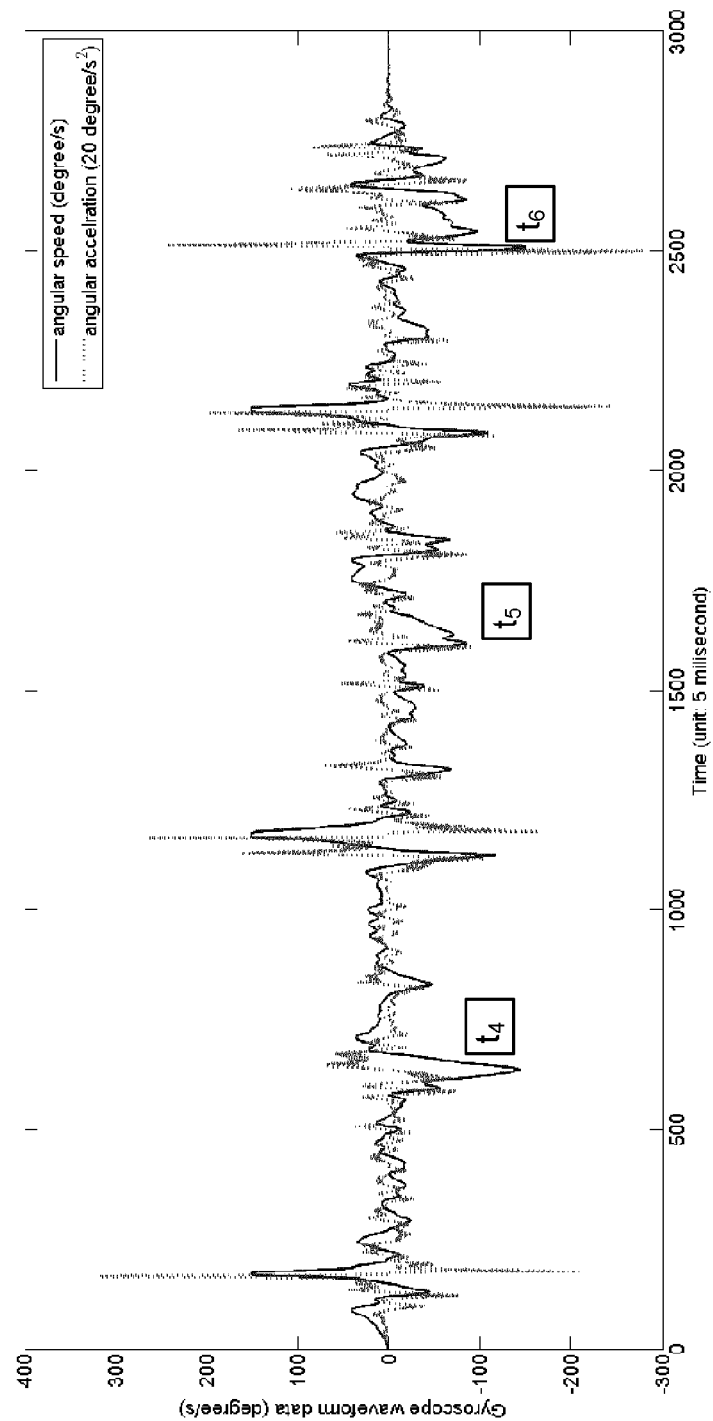
FIG. 3B is a graph showing the output signal of FIG. 3A and associated angular accelerations.

FIG. 3A is a graph showing the angular velocity ($\omega$) output from a z-axis gyroscope mounted on the head of a user while performing three jumps with "hard" landings (i.e., the user does not absorb much of the landing impact force by bending their legs or otherwise cushioning the landing). In the graph of FIG. 3A, the vertical axis represents angular velocity in units of degrees per second, and the horizontal axis represents time in units of 5 milliseconds. FIG. 3B shows the output of FIG. 3A along with its derivative, which represents the corresponding angular acceleration ($\alpha$), in units of 20 degrees per second squared. Times t1, t2 and t3 indicate jump takeoff times. Times t4, t5 and t6 indicate jump landing times.

As can be seen in FIGS. 3A and 3B, jump takeoff times may be defined by relatively large positive values of $\omega$ and $\alpha$. (In the illustrated examples, positive values of $\omega$ and $\alpha$ represent upward head tilting, and negative values of $\omega$ and $\alpha$ represent downward head tilting.) For example, a jump takeoff may be indicated by $\omega$ exceeding a first jump angular velocity threshold $\omega_{J1}$. Similarly, a jump takeoff may be indicated by a exceeding an angular acceleration threshold $\alpha_J$.

Also, in the case of hard landings as shown in FIGS. 3A and 3B, jump landing times may be defined by relatively large negative values of $\omega$. For example, a jump landing may be indicated by $\omega$ being less than a negative landing angular velocity threshold $-\omega_L$.

Figure 3C:
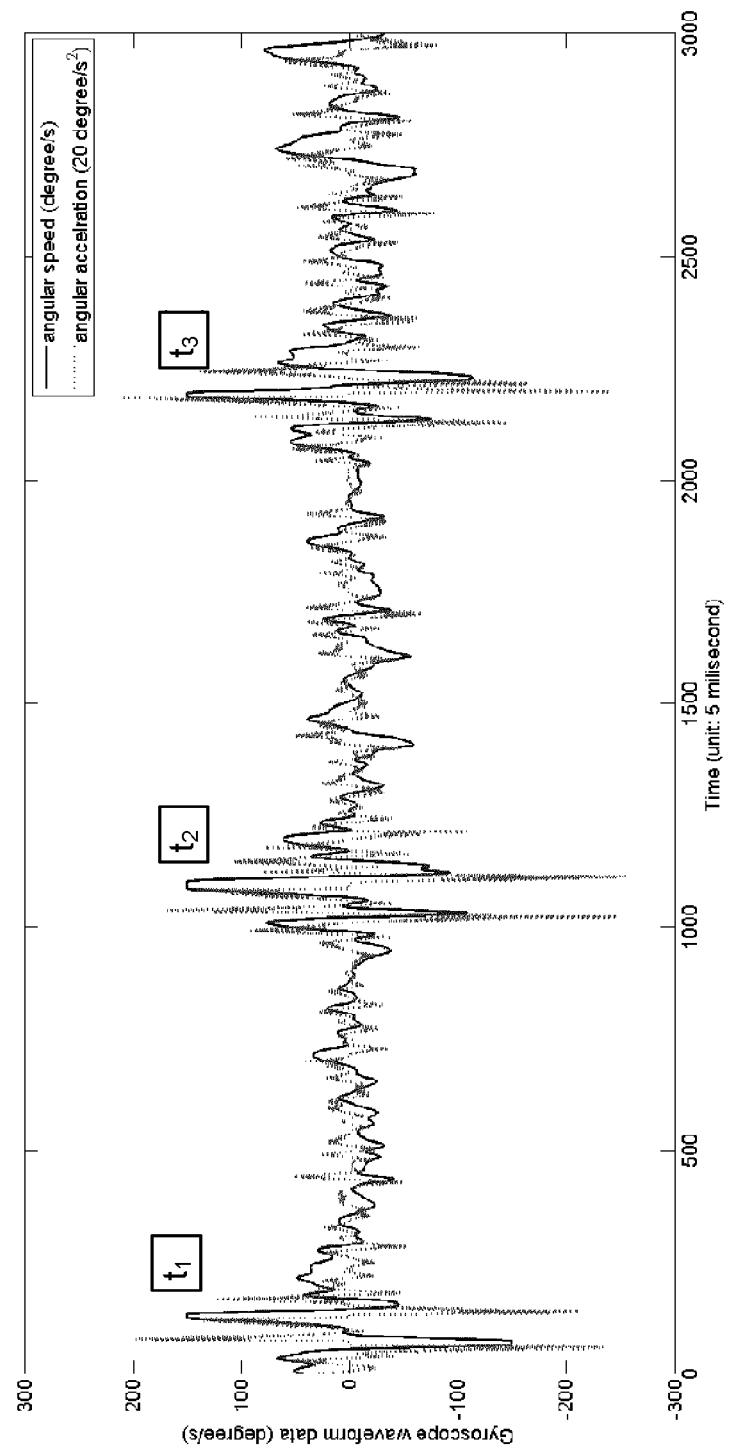
FIG. 3C is a graph showing an example output signal from a head-mounted gyroscope, and associated angular accelerations, during three jumps with "soft" landings.

FIG. 3C is a graph showing $\omega$ and $\alpha$ in the same units as FIG. 3B, except that FIG. 3C shows the $\omega$ output of the z-axis gyroscope (and its derivative) mounted on the head of a user while performing three jumps with "soft" landings (i.e., the user absorbs some of the landing impact force by bending their legs or otherwise cushioning the landing). In such situations, jump takeoff times may still be defined by relatively large positive values of both ω and α. However, due to the user's cushioning of the landing, the peak negative values of ω may not be very large in comparison to noise and random head movements measured by the z-axis gyroscope, and as such may not be reliable for indicating landing times. Accordingly, in such situations, the inventors have determined that landing times may be defined by the duration of a negative ω peak (i.e., the time period that ω remains less than zero). This duration may be referred to herein as $T_{-\omega}$. For example, a landing time may be indicated by $T_{-\omega}$ exceeding a landing time threshold $T_L$. $T_L$ may, for example and without limitation, be 0.7 seconds in some embodiments.

Figure 3D:
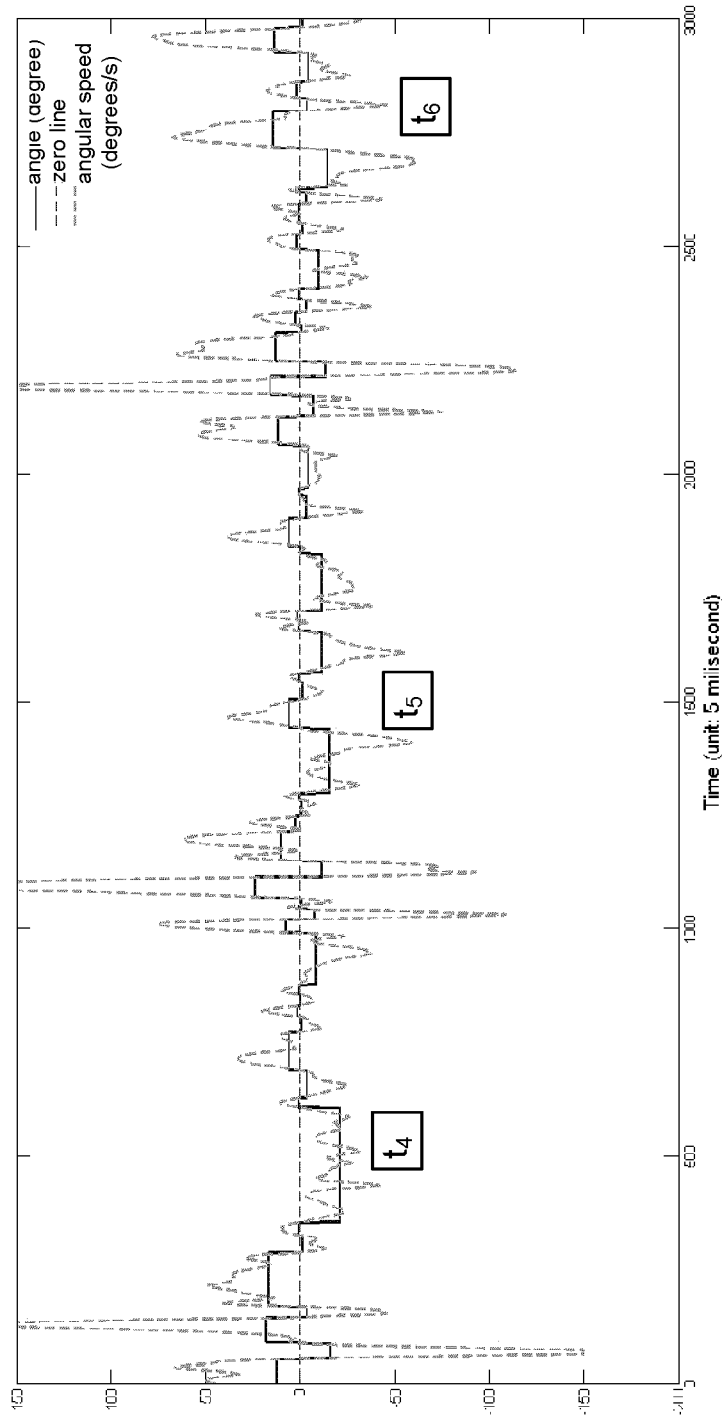
FIG. 3D is a graph showing the output signal of FIG. 3A, associated angular accelerations, and associated angles.

The user's head angle may also be determined by integrating the ω output of the z-axis gyroscope over time. For example, the solid line in FIG. 3D is a representation of the cumulative head angle for each positive and negative peak in ω of FIG. 3C.

Figure 3E:
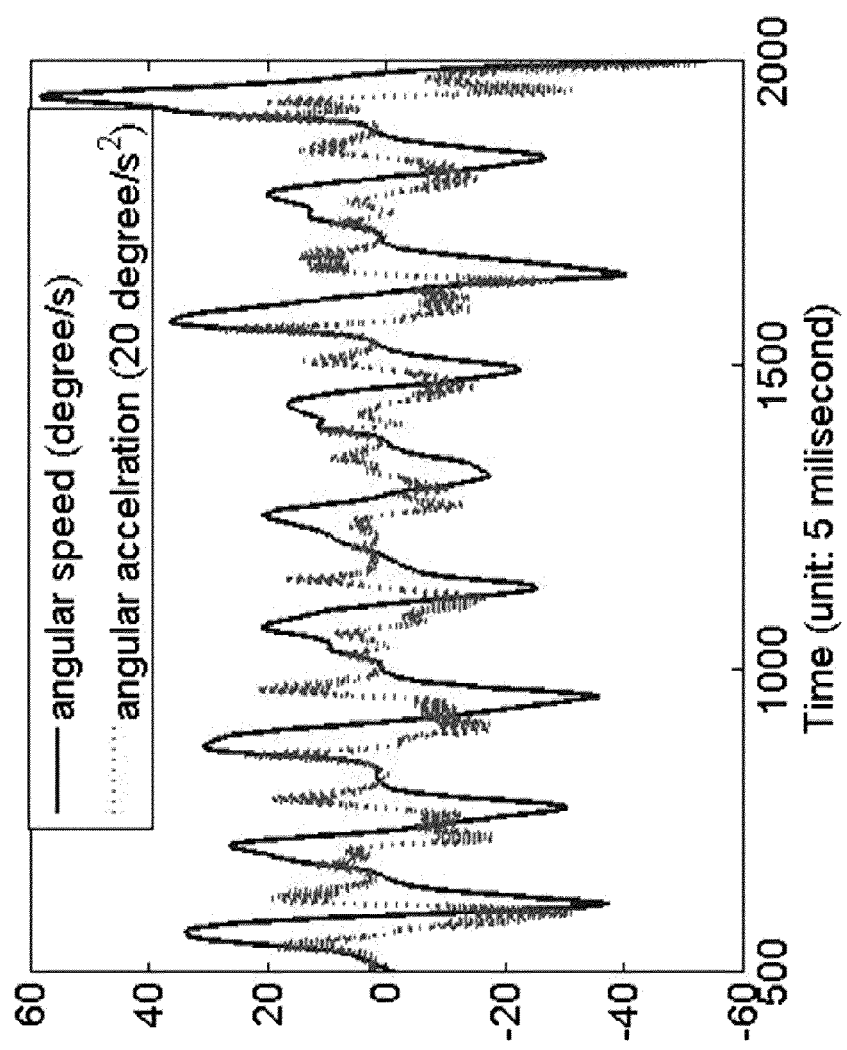
FIG. 3E is a graph showing an example output signal from a head-mounted gyroscope, and associated angular accelerations, during "normal" head nodding by a user.
Figure 3F:
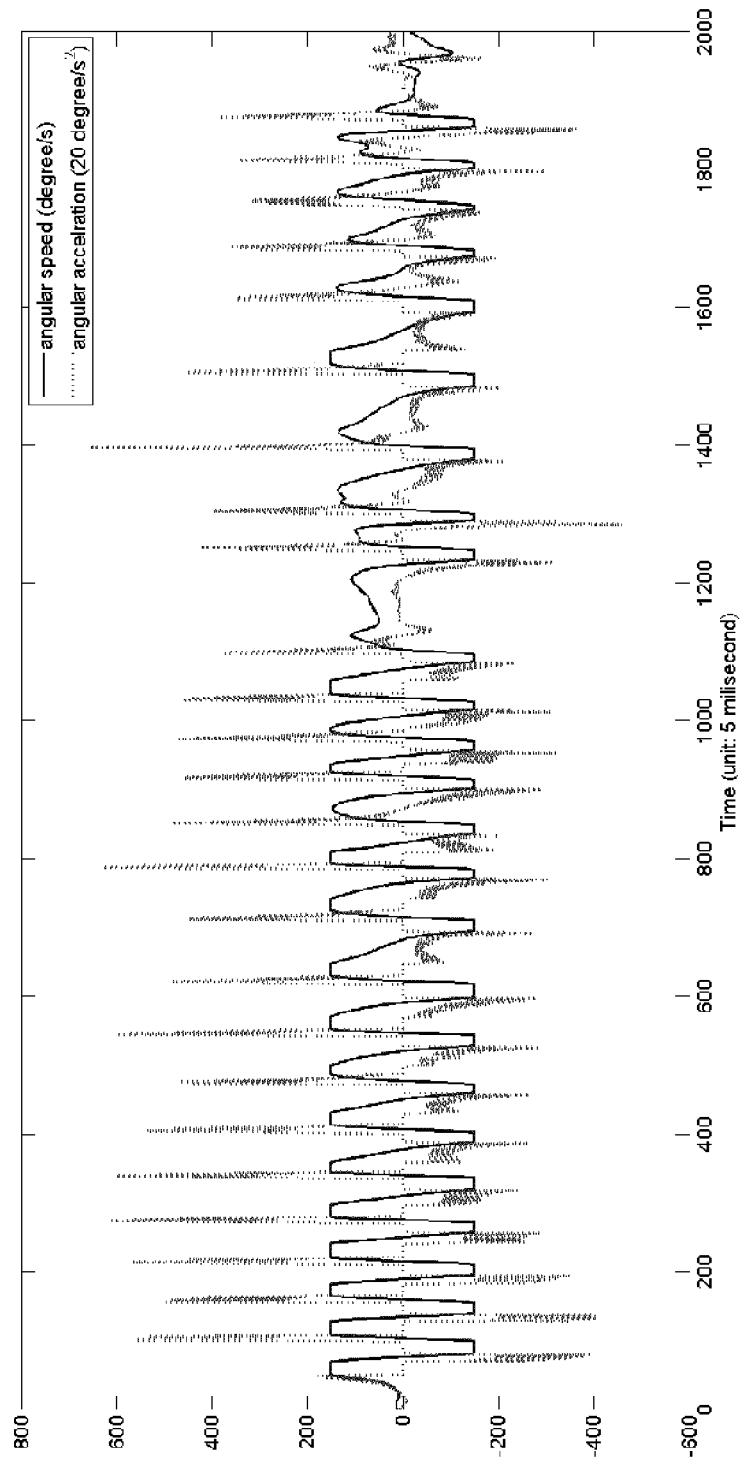
FIG. 3F is a graph showing an example output signal from a head-mounted gyroscope, and associated angular accelerations, during "fierce" head nodding by a user.
Figure 3G:
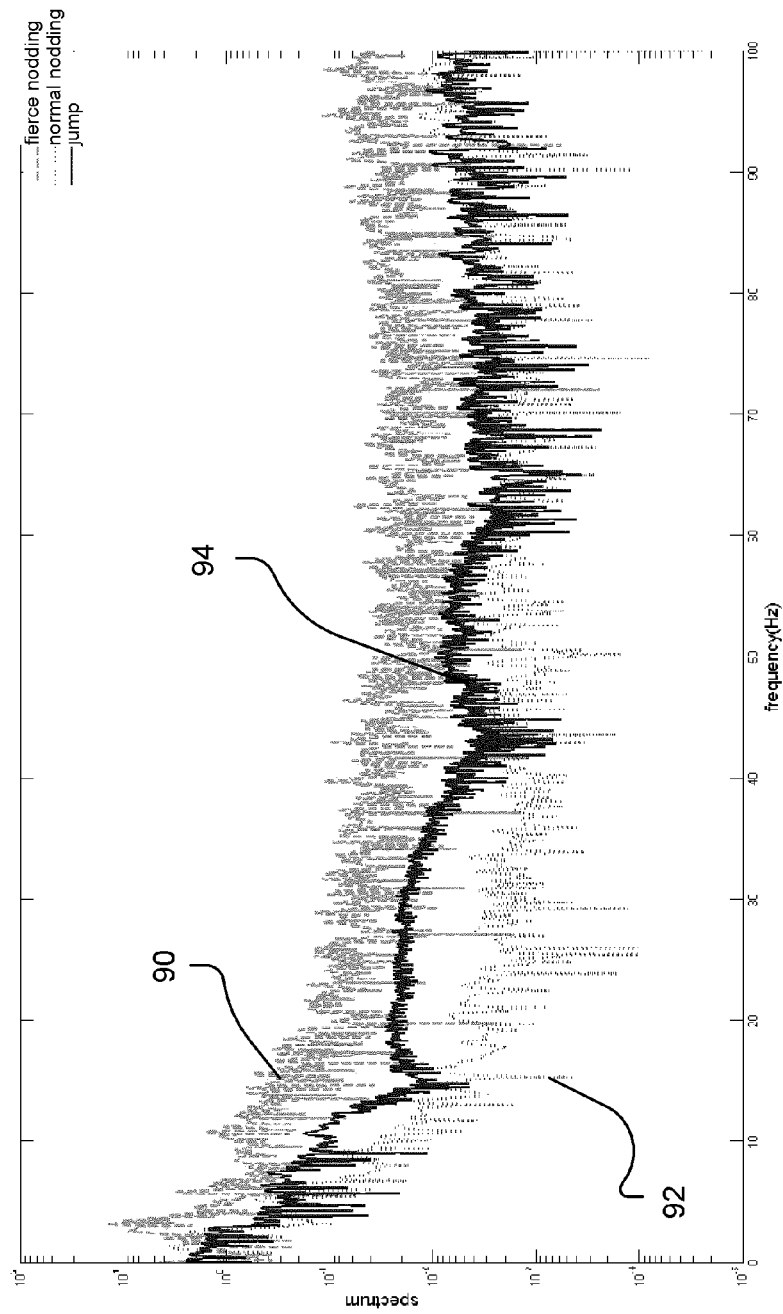
FIG. 3G is a graph showing a comparison of example frequency spectrums of gyroscope output signals from jumping, normal head nodding and fierce head nodding.

Another challenge in detecting jumps based on head angular velocity is that the user may make voluntary head motions, such as nodding, which could result in false positive jump detections. FIGS. 3E and 3F show the ω output of a z-axis gyroscope (and its derivative) mounted on the head of a user engaging in "normal" nodding and "fierce" or "vigorous" nodding, respectively. FIG. 3G shows a comparison of example frequency spectrums for fierce nodding 90, normal nodding 92, and jumping 94.

One characteristic of head nodding is that the ω value exceeds a first nodding angular velocity threshold $\omega_{N1}$, so that small vibrations of the head are not detected as nodding. Another characteristic of head nodding is that an "up-down-up" pattern should occur within a relatively short period of time, with adjacent peaks occurring within a nodding time threshold $t_N$. $t_N$ may, for example and without limitation, be 2 seconds in some embodiments.

Another characteristic of head nodding is that adjacent peaks are generally the same magnitude, except one is positive and the other is negative. Accordingly, a jump takeoff may be indicated when the absolute value of the sum of a first peak $\omega_{p1}$ and a second peak $\omega_{p2}$ exceed a second jump angular velocity threshold $\omega_{J2}$, and head nodding may be indicate when this quantity ($|\omega_{p1}+\omega_{p2}|$) is below a second nodding angular velocity threshold $\omega_{N2}$.

Figure 4:
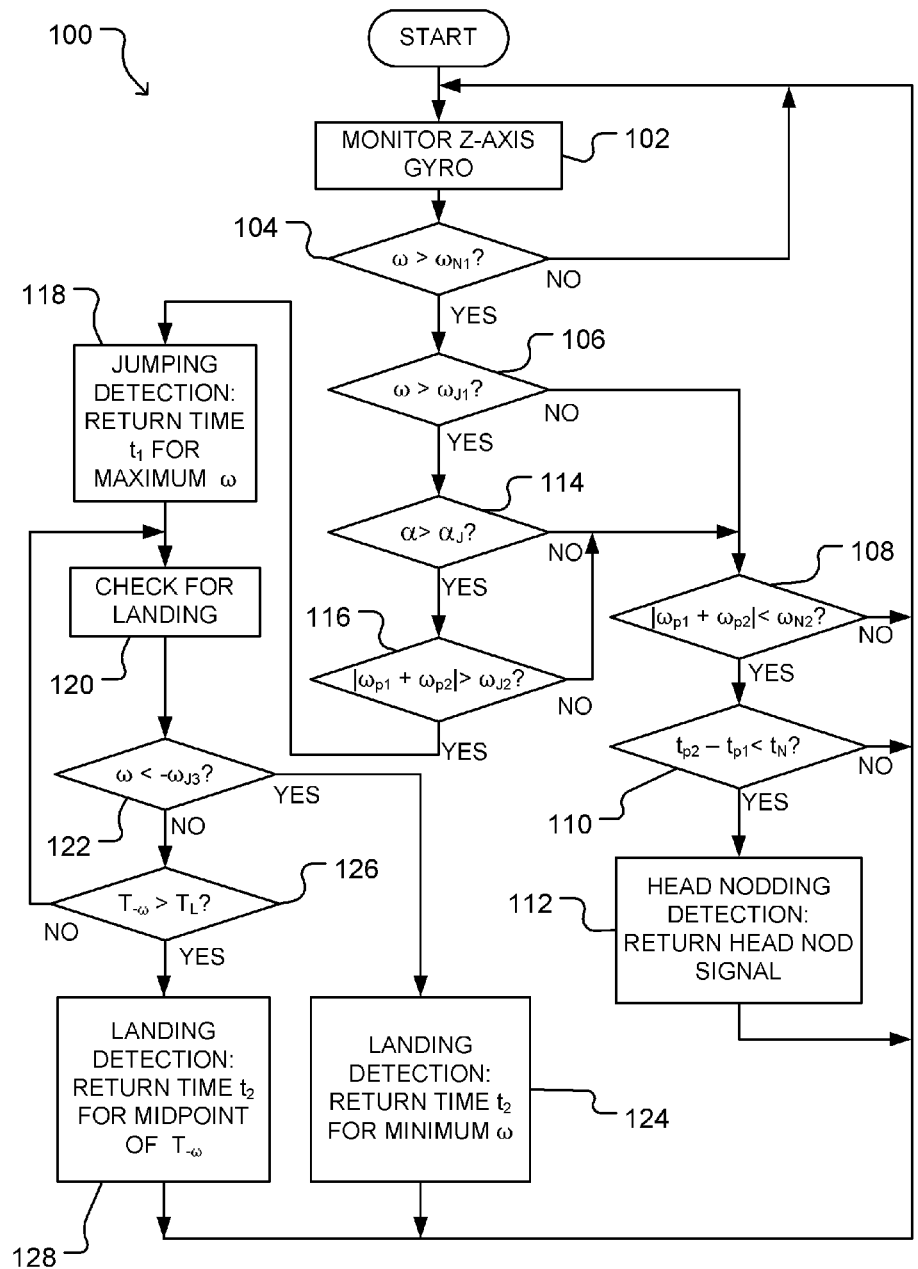
FIG. 4 is a flowchart showing a method of providing a user with jump information according to one embodiment of the invention.

FIG. 4 shows an example method 100 for determining jump information based only on the output of a gyroscope which may be carried out by a head mounted information system according to certain embodiments of the invention. Head mounted information systems according to some embodiments may be configured to carry out method 100 when a user selects a "jump mode" or the like, for example.

Method 100 begins at block 102, where the processor monitors the output of a z-axis gyroscope configured to measure angular velocity ω about a generally horizontal axis oriented generally perpendicular to a direction the athlete is facing. At block 104, the processor determines if ω exceeds $\omega_{N1}$. If it does not (block 104 NO output), method 100 returns to block 102. If ω does exceed $\omega_{N1}$ (block 104 YES output), method 100 proceeds to block 106.

At block 106, the processor determines if ω exceeds $\omega_{J1}$. If not (block 106 NO output), method 100 proceeds to block 108. At block 108, the processor obtains first and second peak ω values and determines if $|\omega_{p1}+\omega_{p2}|$ is less than $\omega_{N2}$. If not (block 108 NO output), method 100 returns to block 102. If $|\omega_{p1}+\omega_{p2}|$ is less than $\omega_{N2}$ (block 108 YES output), method 100 proceeds to block 110. At block 110, the processor determines the time interval $t_{p2}-t_{p1}$ between the first and second peak ω values and determines if $t_{p2}-t_{p1}$ is less than $t_N$. If not (block 110 NO output), method 100 returns to block 102. If $t_{p2}-t_{p1}$ is less than $t_N$, method 100 proceeds to block 112, where the processor detects head nodding and returns a head nod signal. Method 100 returns to block 102 after block 112.

If ω does exceed $\omega_{J1}$ (block 106 YES output), method 100 proceeds to block 114. At block 114, the processor takes the time derivative of ω to determine an angular velocity α, and determines if α exceeds $\alpha_J$. If not (block 114 NO output), method 100 proceeds to block 108 as discussed above. If α exceeds $\alpha_J$ (block 114 YES output), method 100 proceeds to block 116. At block 116, the processor obtains first and second peak ω values and determines if $|\omega_{o1}+\omega_{p2}|$ exceeds $\omega_{J2}$. If not, method 100 proceeds to block 108 as discussed above. If $|\omega_{p1}+\omega_{p2}|$ exceeds $\omega_{J2}$ (block 116 YES output), method 100 proceeds to block 118.

At block 118, the processor detects the occurrence of a jump, and returns a takeoff time $t_1$ corresponding to a maximum ω value. After block 118, method 100 proceeds to block 120 where the processor begins to check for landing conditions in the ω output, then proceeds to block 122. At block 122, the processor determines if ω is less than $-\omega_L$. If it is (block 122 YES output), method 100 proceeds to block 124 where the processor detects a landing and returns a landing time $t_2$ corresponding to a minimum ω value. After block 124 method 100 returns to block 102.

If ω is not less than $-\omega_L$ (block 122 NO output), method 100 proceeds to block 126, where the processor determines the duration of a negative ω peak $T_{-\omega}$ and determines if $T_{-\omega}$ exceeds $T_L$. If not (block 126 NO output), method 100 returns to block 120 and the processor continues to check for a landing. If $T_{-\omega}$ exceeds $T_L$ (block 126 YES output), method 100 proceeds to block 128 where the processor detects a landing and returns a landing time $t_2$ corresponding to the midpoint of $T_{-\omega}$. After block 128 method 100 returns to block 102.

Figure 5:
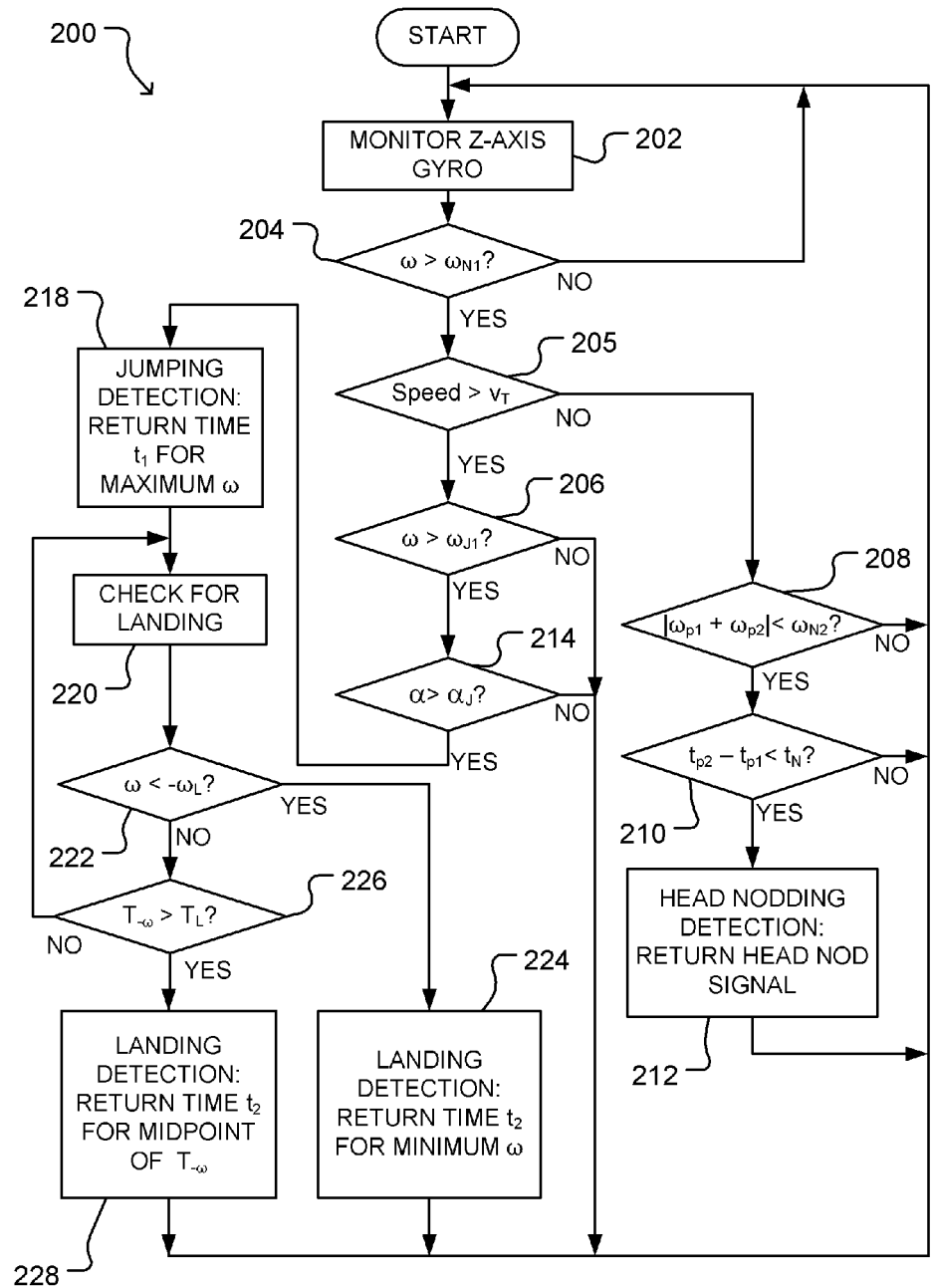
FIG. 5 is a flowchart showing a method of providing a user with jump information according to another embodiment of the invention.

FIG. 5 shows an example method 200 for determining jump information based on the output of a gyroscope and a GPS receiver which may be carried out by a head-mounted information system according to certain embodiments of the invention. Head-mounted information systems according to some embodiments may be configured to carry out method 200 when a user selects a "jump mode" or the like, for example.

Method 200 begins at block 202, where the processor monitors the output of a z-axis gyroscope configured to measure angular velocity ω about a generally horizontal axis oriented generally perpendicular to a direction the athlete is facing. At block 204, the processor determines if ω exceeds $\omega_{N1}$. If it does not (block 204 NO output), method 200 returns to block 202. If ω does exceed $\omega_{N1}$ (block 204 YES output), method 200 proceeds to block 205.

At block 205, the processor checks signals from a GPS receiver to determine a speed of the user, and compares the speed to a speed threshold $v_T$. Alternatively or additionally, in embodiments which comprise accelerometers, the processor could determine or confirm the speed of the user based on the accelerometer outputs. If the speed does not exceed $v_T$, (block 205 NO output) method 200 proceeds to block 208. At block 208, the processor obtains first and second peak ω values and determines if $|\omega_{p1}+\omega_{p2}|$ is less than $\omega_{N2}$. If not (block 208 NO output), method 200 returns to block 202. If $|\omega_{p1}+\omega_{p2}|$ is less than $\omega_{N2}$ (block 208 YES output), method 200 proceeds to block 210. At block 210, the processor determines the time interval $t_{p2}-t_1$ between the first and second peak ω values and determines if $t_{p2}-t_{p1}$ is less than $t_N$. If not (block 210 NO output), method 200 returns to block 202. If $t_{p2}-t_1$ is less than $t_N$, method 200 proceeds to block 212, where the processor detects head nodding and returns a head nod signal. Method 200 returns to block 202 after block 112.

If the speed does exceed $v_T$, (block 205 YES output) method 200 proceeds to block 206. At block 206, the processor determines if ω exceeds $ω_{J1}$. If not (block 206 NO output), method 200 returns to block 202. If ω does exceed $ω_{J1}$ (block 206 YES output), method 200 proceeds to block 214. At block 214, the processor takes the time derivative of ω to determine an angular velocity α, and determines if α exceeds $α_J$. If not (block 214 NO output), method 200 returns to block 202. If α exceeds $α_J$ (block 214 YES output), method 100 proceeds to block 218.

At block 218, the processor detects the occurrence of a jump, and returns a takeoff time $t_J$ corresponding to a maximum ω value. After block 218, method 200 proceeds to block 220 where the processor begins to check for landing conditions in the ω output, then proceeds to block 222. At block 222, the processor determines if ω is less than $-ω_L$. If it is (block 222 YES output), method 200 proceeds to block 224 where the processor detects a landing and returns a landing time $t_2$ corresponding to a minimum ω value. After block 224 method 200 returns to block 202.

If ω is not less than $-ω_L$ (block 222 NO output), method 200 proceeds to block 226, where the processor determines the duration of a negative ω peak $T_{-ω}$ and determines if $T_{-ω}$ exceeds $T_L$. If not (block 226 NO output), method 200 returns to block 220 and the processor continues to check for a landing. If $T_{-ω}$ exceeds $T_L$ (block 226 YES output), method 200 proceeds to block 228 where the processor detects a landing and returns a landing time $t_2$ corresponding to the midpoint of $T_{-ω}$. After block 228 method 200 returns to block 202.

Figure 6:
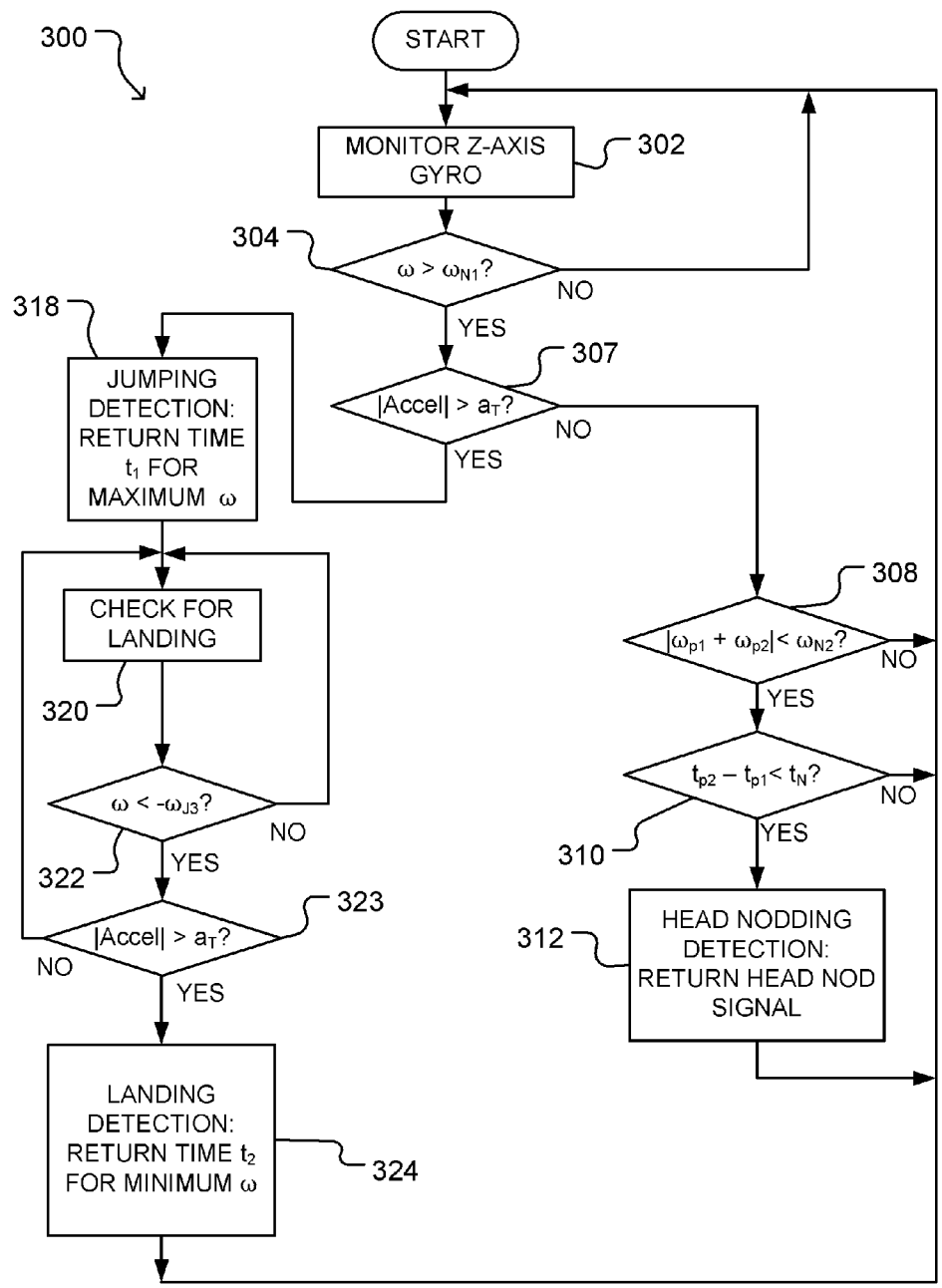
FIG. 6 is a flowchart showing a method of providing a user with jump information according to another embodiment of the invention.

FIG. 6 shows an example method 300 for determining jump information based on the output of a gyroscope and an accelerometer which may be carried out by a head-mounted information system according to certain embodiments of the invention. Head-mounted information systems according to some embodiments may be configured to carry out method 300 when a user selects a "jump mode" or the like, for example.

Method 300 begins at block 302, where the processor monitors the output of a z-axis gyroscope configured to measure angular velocity ω about a generally horizontal axis oriented generally perpendicular to a direction the athlete is facing. At block 304, the processor determines if ω exceeds $ω_{N1}$. If it does not (block 304 NO output), method 300 returns to block 302. If ω does exceed $ω_{N1}$ (block 304 YES output), method 300 proceeds to block 307.

At block 307, the processor checks the output of an accelerometer configured to measure acceleration and compares the magnitude (vector norm) of the acceleration to an acceleration threshold $α_T$. If the magnitude of the acceleration does not exceed $a_T$ (block 307 NO output), method 300 proceeds to block 308.

At block 308, the processor obtains first and second peak ω values and determines if $|ω_{p1}+ω_{p2}|$ is less than $ω_{N2}$. If not (block 308 NO output), method 300 returns to block 302. If $|ω_{p1}+ω_{p2}|$ is less than $ω_{N2}$ (block 308 YES output), method 300 proceeds to block 310. At block 310, the processor determines the time interval $t_{p2}-t_{p1}$ between the first and second peak ω values and determines if $t_{p2}-t_{p1}$ is less than $t_N$. If not (block 310 NO output), method 300 returns to block 302. If $t_{p2}-t_{p1}$ is less than $t_N$, method 300 proceeds to block 312, where the processor detects head nodding and returns a head nod signal. Method 300 returns to block 302 after block 312.

If the magnitude of the acceleration does exceed $a_T$ (block 307 YES output), method 300 proceeds to block 318. At block 318, the processor detects the occurrence of a jump, and returns a takeoff time $t_1$ corresponding to a maximum ω value. After block 318, method 300 proceeds to block 320 where the processor begins to check for landing conditions in the ω output, then proceeds to block 322. At block 322, the processor determines if ω is less than $-ω_L$. If ω is not less than $-ω_L$ (block 322 NO output), method 300 returns to block 320 and the processor continues to check for a landing. If ω is less than $-ω_L$ (block 322 YES output), method 300 proceeds to block 323.

At block 323 the processor checks the output of an accelerometer configured to measure acceleration and compares the magnitude (vector norm) of the acceleration to an acceleration threshold $α_T$. If the magnitude of the acceleration does not exceed $a_T$ (block 323 NO output), method 300 returns to block 320 and the processor continues to check for a landing. If the magnitude of the acceleration does exceed $a_T$ (block 323 YES output), method 300 proceeds to block 324 where the processor detects a landing and returns a landing time $t_2$ corresponding to a minimum ω value. After block 324 method 300 returns to block 302.

Figure 7:
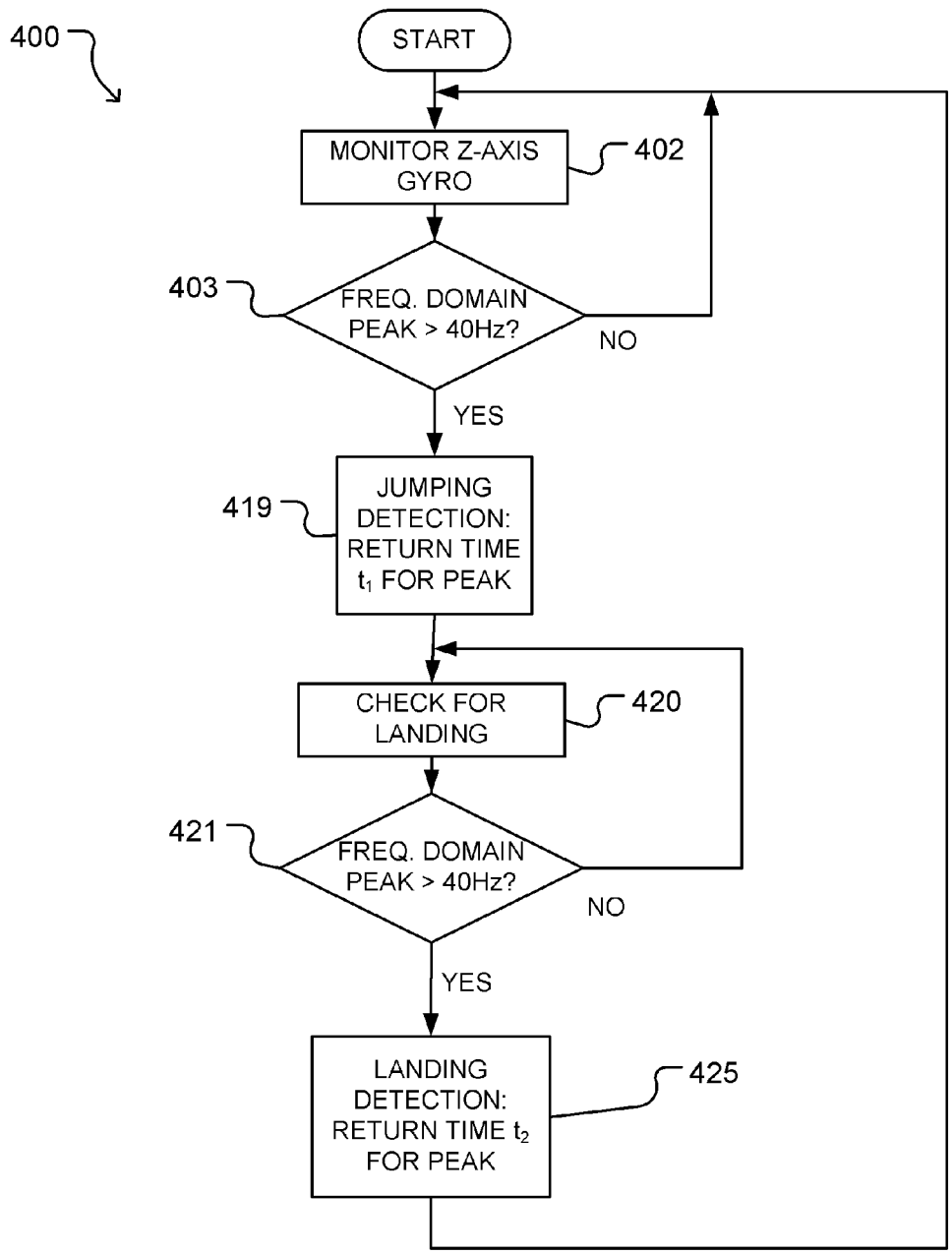
FIG. 7 is a flowchart showing a method of providing a user with jump information according to another embodiment of the invention.

FIG. 7 shows an example method 400 for determining jump information based on the output of a gyroscope which may be carried out by a head-mounted information system according to certain embodiments of the invention. Head-mounted information systems according to some embodiments may be configured to carry out method 400 when a user selects a "jump mode" or the like, for example.

Method 400 begins at block 402, where the processor monitors the output of a z-axis gyroscope configured to measure angular velocity ω about a generally horizontal axis oriented generally perpendicular to a direction the athlete is facing. At block 403 the processor performs a windowed transformation to analyze the angular velocity ω in a frequency domain (such as, for example a Fourier transform, a Gabor transform, or other transformation from the time domain to the frequency domain), and compares one or more high frequency components of the angular velocity ω(HF) to one or more jump frequency thresholds.

As shown in FIG. 3G, jumping frequency spectrum 94 exhibits a peak above 40 Hz which is not present in nodding frequency spectrums 90 and 92. In some embodiments, at block 403 the processor looks for a peak in the frequency spectrum of the angular velocity ω above about 40 Hz. If there is no peak above about 40 Hz, method 400 returns to block 402. If there is a peak above about 40 Hz, method 400 proceeds to block 419.

At block 419, the processor detects the occurrence of a jump, and returns a takeoff time $t_1$ corresponding to the peak in the frequency spectrum. After block 419, method 400 proceeds to block 420 where the processor begins to check for landing conditions in the ω output, then proceeds to block 421. At block 421, the processor performs a windowed transformation to analyze the angular velocity ω in a frequency domain (such as, for example a Fourier transform, a Gabor transform, or other transformation from the time domain to the frequency domain), and compares one or more high frequency components of the angular velocity ω to one or more jump frequency thresholds. In some embodiments, at block 421 the processor looks for a peak in the frequency spectrum of the angular velocity ω above about 40 Hz. If there is no peak above about 40 Hz, method 400 returns to block 420 and the processor continues to check for a landing. If there is a peak above about 40 Hz, method 400 proceeds to block 425 where the processor detects a landing and returns a landing time $t_2$ corresponding to the peak in the frequency spectrum. After block 425 method 400 returns to block 402.

Example methods 100, 200, 300 and 400 described above include a number of techniques for determining head nodding, jump takeoffs and jump landings. In some embodiments, techniques from different example methods may be combined to check different combinations of characteristics to detect head nods, takeoffs and landings. For example, the frequency spectrum peak check of method 400 may be used in conjunction with one or more of the angular velocity threshold techniques of methods 100, 200 and 300. Similarly, the GPS-based speed check of method 200 may be used in conjunction with the accelerometer-based linear acceleration check of method 300. Also, the takeoff detection techniques from one or more of methods 100, 200, 300 and 400 or other takeoff detection techniques may be combined with the landing detection techniques of another one or more of methods 100, 200, 300 and 400 or other landing detection techniques.

Figure 8:
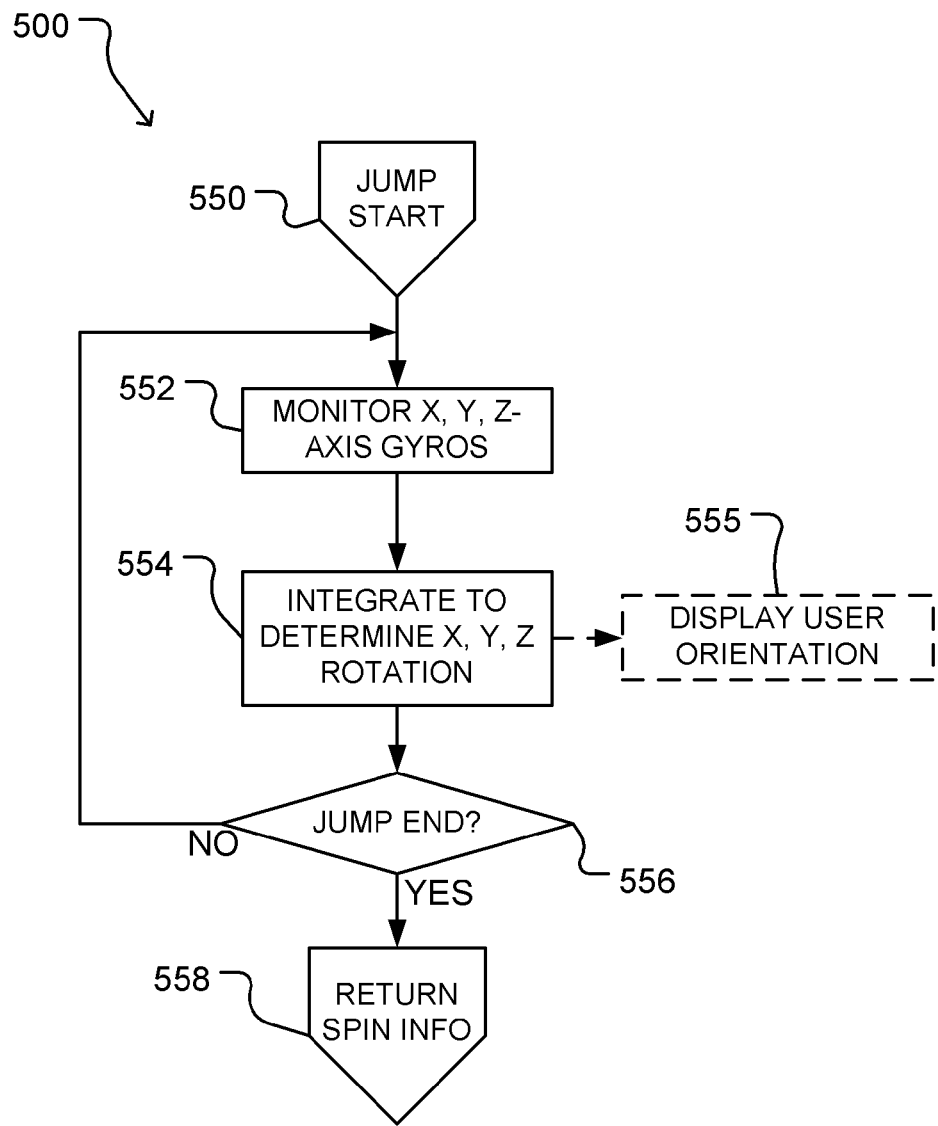
FIG. 8 is a flowchart showing a method of providing a user with jump information according to another embodiment of the invention.

FIG. 8 shows an example method 500 for determining jump information based on the output of a gyroscope which may be carried out by a head-mounted information system according to certain embodiments of the invention. Method 500 may, for example, be used in conjunction with one or more of methods 100, 200, 300 and 400 or other methods which detect jump takeoffs and landings. Head-mounted information systems according to some embodiments may be configured to carry out method 500 when the system detects a jump in a "jump mode", for example.

Method 500 begins at block 550, when the processor receives a jump start indication. Jump start indication may, for example, be provided by execution of a method such as methods 100, 200, 300 and/or 400 described above to detect a jump takeoff. Method 500 may also be used in conjunction with other methods of detecting a takeoff.

After block 550, method 500 proceeds to block 552, where the processor monitors the gyroscope outputs to determine angular velocities about the x-axis, y-axis and z-axis. At block 554 the processor integrates the angular velocities about the x-axis, y-axis and z-axis to determine resulting rotations. At block 556 the processor determines if a jump end indication has occurred. For example, in some embodiments, a jump end indication may occur when the processor detects a landing using techniques such as described above with respect to method 100, 200, 300 and/or 400. Method 500 may also be used in conjunction with other methods of detecting a landing. If no jump end indication has occurred (block 556 NO output), method 550 returns to block 552 and cycles through blocks 552, 554, and 556, until a jump end indication occurs. Once a jump end indication occurs (block 556 YES output), method 500 proceeds to block 558 where the processor returns spin information for the jump for displaying to the user and/or storing for later retrieval, and method 500 ends.

In some embodiments, the processor may also monitor other sensor data during block 552 such as, for example, accelerometer outputs or GPS signals, or outputs of a pressure sensor or altimeter. Such other sensor data may be used to improve the determination of rotation at block 554, and/or to determine other jump parameters such as jump airtime, maximum jump height, drop distance, etc.

In some embodiments the processor may also return a jump success (or lack of success) indication at block 558. For example, if the processor determines that a rotation about the y-axis (i.e. an axis oriented generally vertically when the user is in a normal standing position) of about 180 or 360 degrees (or some other integer multiple of 180 degrees) has occurred by the time the landing is detected, the processor may indicate a successful jump. On the other hand, if the processor determines that a y-axis rotation of about 90 or 270 degrees (or some other odd integer multiple of 90 degrees) has occurred, the processor may indicate an unsuccessful jump. The processor may also use other sensor data to determine jump success in some embodiments.

In some embodiments, method 500 comprises block 555 which is executed substantially simultaneously with block 554. At block 555, the processor causes the display to show user orientation information to the user based on the rotations determined in block 554. In some embodiments, the processor may be configured to display orientation information in real time, or nearly real time, such that the orientation information may assist the user in successfully competing a jump.

Embodiments of present invention can be adapted for use in a variety of environments. By way of non-limiting example, embodiments of the present invention may be used in sporting activities, such as snowboarding, skiing, snowmobiling, cycling (including motorcycling, moto-cross and mountain biking), kite surfing, sky diving, cross country running or the like. Such sporting activities may be enhanced by head-mounted information systems according to embodiments of the present invention. Suitable sporting activities may include any activities in which participants typically use goggles, helmets or other head-mounted devices during the activities, but embodiments of the invention can be used in other activities (i.e. activities wherein participants do not typically used head-mounted devices). In other embodiments, head-mounted information systems similar to those described herein can be used in military, police, or rescue settings. Certain embodiments of present invention provide lightweight affordable solutions that are non-obtrusive for front and peripheral vision enabling features such as navigation, buddy tracking, silent communication direct to eye, emergency GPS coordinate dispatch to HQ, and various performance measurements using built-in sensors and/or wireless connectivity to external devices and services. In yet another embodiment of the present invention, traditional endurance sports such as triathlon, running, speed skating, cycling, and rowing can also benefit from devices according to other embodiments of the present invention. These endurance sports and would benefit greatly from easy accessible performance read-outs during the activity.

Figure 9:
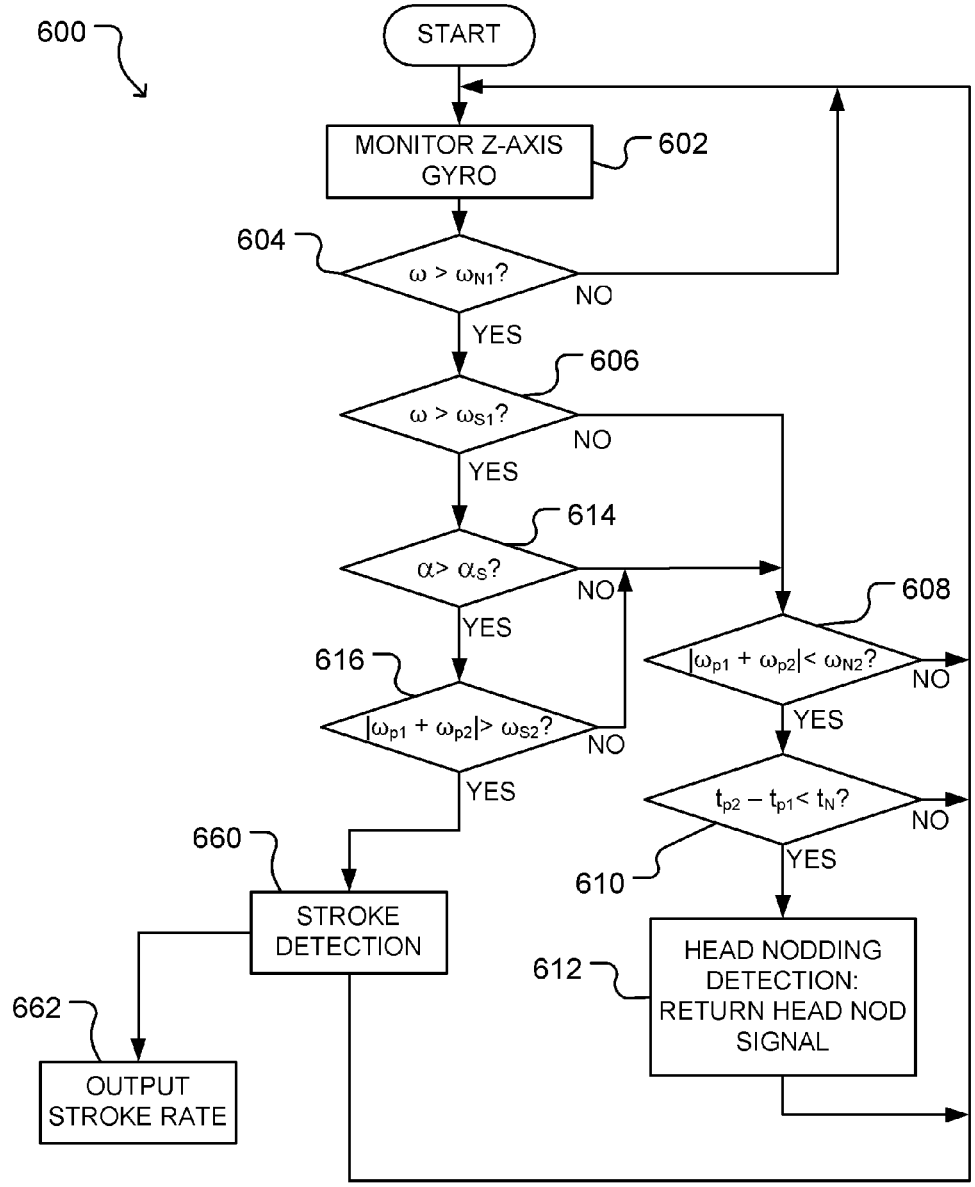
FIG. 9 is a flowchart showing a method of providing a user rowing a boat with stroke rate information according to another embodiment of the invention.

For example, certain embodiments provide head-mounted information systems, such as, for example system 10', 10B' or 10C' described above, which are configured to detect a stroke rate of a user rowing a boat. FIG. 9 shows an example method 600 for determining stroke rate based only on the output of a gyroscope which may be carried out by a head mounted information system according to certain embodiments of the invention. Head mounted information systems according to some embodiments may be configured to carry out method 600 when a user selects a "rowing mode" or the like, for example.

Method 600 begins at block 602, where the processor monitors the output of a z-axis gyroscope configured to measure angular velocity ω about a generally horizontal axis oriented generally perpendicular to a direction the athlete is facing. At block 604, the processor determines if ω exceeds $\omega_{N1}$. If it does not (block 604 NO output), method 600 returns to block 602. If ω does exceed $\omega_{N1}$ (block 604 YES output), method 600 proceeds to block 606.

At block 606, the processor determines if ω exceeds a stroke angular velocity threshold $\omega_{S1}$. If not (block 106 NO output), method 600 proceeds to block 608. At block 608, the processor obtains first and second peak ω values and determines if $|\omega_{p1}+\omega_{p2}|$ is less than $\omega_{N2}$. If not (block 608 NO output), method 600 returns to block 602. If $|\omega_{p1}+\omega_{p2}|$ is less than $\omega_{N2}$ (block 608 YES output), method 600 proceeds to block 610. At block 610, the processor determines the time interval $t_{p2}-t_{p1}$ between the first and second peak ω values and determines if $t_{p2}-t_{p1}$ is less than $t_N$. If not (block 610 NO output), method 600 returns to block 602. If $t_{p2}-t_{p1}$ is less than $t_N$, method 600 proceeds to block 612, where the processor detects head nodding and returns a head nod signal. Method 600 returns to block 602 after block 612.

If ω does exceed $ω_{S1}$ (block 606 YES output), method 600 proceeds to block 614. At block 614, the processor takes the time derivative of ω to determine an angular velocity α, and determines if a exceeds a stroke angular acceleration threshold $α_s$. If not (block 614 NO output), method 600 proceeds to block 608 as discussed above. If a exceeds $α_s$ (block 614 YES output), method 600 proceeds to block 616. At block 616, the processor obtains first and second peak ω values and determines if $|ω_{p1}+ω_{p2}|$ exceeds a second stroke angular velocity threshold $ω_{s2}$. If not, method 600 proceeds to block 608 as discussed above. If $|ω_{p1}+ω_{p2}|$ exceeds $ω_{s2}$ (block 616 YES output), method 600 proceeds to block 660.

At block 660, the processor detects that a stroke has occurred and records a time at which the stroke occurred. After block 660, method returns to block 602 to cycle through the stroke detection process again. Once two or more strokes have occurred, the processor determines the stroke rate based on the time between strokes and outputs the stroke rate at block 662. In some embodiments, the processor may be configured to output an average stroke rate based on more than two strokes. In some embodiments, the processor may be configured to output a current stroke rate based on the time between a currently detected stroke and the most recently detected previous stroke. In embodiments including a head mounted display incorporated into glasses, goggles or the like, outputting the stroke rate may comprise displaying the stroke rate on the head mounted display.

In still more embodiments of the present invention other activities can be enhanced. In a gaming embodiment head-mounted information systems can record a wearer's activities and upload this to online software applications which may share with a community. For example, head-mounted information systems could record a user's moves on the mountain and facilitate uploading of 3d approximations of such moves to an online community. Head-mounted information systems may also be capable of downloading information (e.g. a professional snowboarder's moves). Such downloaded information may be used to practice while receiving instructions direct to eye during the activity. Certain embodiments of the present invention can be used for instructional purposes, where physical activity is involved making normal paper or pocket based aids inconvenient.

Certain implementations of the invention comprise computer processors which execute software instructions which cause the processors to perform a method of the invention. For example, one or more processors in a head mounted information system may implement the methods described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As one skilled in the art will appreciate, the example embodiments discussed above are for illustrative purposes only, and methods and systems according to embodiments of the invention may be implemented in any suitable device having appropriately configured processing hardware. Such processing hardware may include one or more conventional processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A head mounted information system comprising:
    a frame configured to be worn by a user;
    a sensor unit coupled to the frame, the sensor unit comprising a gyroscope configured to produce angular velocity signals representing a head angular velocity about a generally horizontal z-axis oriented generally perpendicular to a direction the user is facing when the user is wearing the frame; and,
    a processor unit coupled to the frame, the processor unit connected to receive signals from the sensor unit,
    wherein the processor unit is configured to receive the angular velocity signals from the sensor unit, monitor the head angular velocity to determine a first peak angular velocity and a second peak angular velocity, calculate a head angular acceleration by taking a derivative of the head angular velocity, detect a jump by the user when the head angular velocity indicates upward head tilting exceeding a first jumping angular velocity threshold, the head angular acceleration indicates upward head tilting exceeding an angular acceleration threshold and an absolute value of a sum of the first and second peak angular velocities exceeds a second jumping angular velocity threshold, and
    wherein the processor is further configured to generate a jump output signal indicting one or more jump parameters.

2. A system according to claim 1 wherein the processor is configured to detect a head nod and generate a head nod output signal when the head angular velocity exceeds a first nodding angular velocity threshold, and:
    the head angular velocity does not exceed the first jumping angular velocity threshold;
    the head angular acceleration does not exceed the angular acceleration threshold; or, the absolute value of the sum of the first and second peak angular velocities does not exceed the second jumping angular velocity threshold.

3. A system according to claim 2 wherein the processor is configured to generate the head nodding signal only when the absolute value of the sum of the first and second peak angular velocities is less than a second nodding angular velocity threshold and a time interval between occurrences of the first and second peak angular velocities is less than a nodding time threshold.

4. A system according to claim 1 wherein the processor is configured to determine a takeoff time comprising a time at which a maximum upward head angular velocity occurs.

5. A system according to claim 4 wherein the processor is configured to detect a landing when the head angular velocity indicates downward head tilting exceeding a landing angular velocity threshold, and to determine a landing time comprising a time at which a maximum downward head angular velocity occurs.

6. A system according to claim 5 wherein the jump output signal comprises a jump airtime, and the processor is configured to calculate the jump airtime by taking a difference between the landing time and the takeoff time.

7. A system according to claim 4 wherein the processor is configured to determine a time period during which the head angular velocity indicates downward head tilting, to detect a landing when the time period exceeds a landing time threshold, and to determine a landing time comprising a midpoint of the time period.

8. A system according to claim 1 wherein the sensor unit comprises a GPS receiver configured to produce speed signals representing a speed of the user.

9. A system according to claim 8 wherein the processor is configured to detect a jump only if the speed of the user exceeds a speed threshold.

10. A system according to claim 1 wherein the sensor unit comprises a three axis accelerometer configured to produce acceleration signals representing linear accelerations of the user, and wherein the processor is configured to determine a speed of the user based on the acceleration signals.

11. A system according to claim 1 comprising a display unit coupled to the frame, the display unit comprising a display for producing an image, wherein the processor is configured to produce a video output signal comprising at least in part the jump output signal and provide the video output signal to the display unit for displaying the one or more jump parameters to the user.

12. A system according to claim 11 wherein the video output signal indicates at least a jump airtime.

13. A system according to claim 1 wherein the processor is configured to transform the angular velocity signals from a time domain to a frequency domain and detect a jump when a frequency spectrum of the angular velocity signals has a peak above a jump frequency threshold.

14. A system according to claim 13 wherein the processor is configured to determine a takeoff time based on a time at which the peak in the frequency spectrum occurs.

15. A system according to claim 13 wherein the processor is configured to detect a landing when a frequency spectrum of the angular velocity signals has a peak above a jump frequency threshold.

16. A system according to claim 15 wherein the processor is configured to determine a landing time based on a time at which the peak in the frequency spectrum occurs.

17. A system according to claim 13 wherein the jump frequency threshold is 40Hz.

18. A system according to claim 1 wherein the sensor unit comprises a three axis gyroscope configured to produce angular velocity signals about the z-axis, an x-axis and a y-axis, wherein the x-axis and y-axis are generally perpendicular to each other and to the z-axis, and wherein the processor is configured to, after detecting a jump and before detecting a landing, determine rotations about the x-axis, y-axis and z-axis.

19. A system according to claim 18 wherein the processor is configured to display orientation information in real time based on the determined rotations.

20. A system according to claim 18 wherein the processor is configured to provide spin information in the jump output signal based on the determined rotations.

21. A system according to claim 18 wherein the processor is configured to provide a jump success indication in the jump output signal based on the determined rotations.

22. A system according to claim 21 wherein the jump success indication is positive when the processor determines a y-axis rotation equal to an integer multiple of 180 degrees, and the jump success indication is negative when the processor determines a y-axis rotation equal to an odd integer multiple of 90 degrees.

23. A system according to claim 1 comprising:
a display unit coupled to the frame, the display unit comprising a display for producing an image;
wherein the processor unit is configured to produce a video output signal indicating performance information based on signals received from the sensor unit and provide the video output signal to the display unit for displaying the performance information to the user.

24. A system according to claim 23 incorporated into a pair of goggles.

25. A system according to claim 23 incorporated into a helmet.

26. A system according to claim 23 wherein the display unit is incorporated into pair of goggles and the sensor unit and the processor unit are incorporated into a helmet.

27. A method of determining one or more jump parameters of a user of a head mounted information system comprising a gyroscope mounted on a frame configured to be worn by the user, the gyroscope configured to produce angular velocity signals representing a head angular velocity about a generally horizontal axis oriented generally perpendicular to a direction the user is facing when the user is wearing the frame, the method comprising:
comparing the head angular velocity to a first jumping angular velocity threshold;
calculating a head angular acceleration by taking a derivative of the head angular velocity and comparing the head angular acceleration to an angular acceleration threshold;
determining a first peak angular velocity and a second peak angular velocity and comparing an absolute value of a sum of the first and second peak angular velocities to a second jumping angular velocity threshold; and
detecting a jump occurrence when the head angular velocity indicates upward head tilting exceeding the first jumping angular velocity threshold, the head angular acceleration indicates upward head tilting exceeding the angular acceleration threshold and the absolute value of the sum of the first and second peak angular velocities exceeds the second jumping angular velocity threshold and;
providing an output signal to the user indicating the jump occurrence.

28. A method according to claim 27 comprising determining a takeoff time comprising a time at which a maximum upward head angular velocity occurs.

29. A method according to claim 28 comprising detecting a landing when the head angular velocity indicates downward head tilting exceeding a landing angular velocity threshold, and determining a landing time comprising a time at which a maximum downward head angular velocity occurs.

30. A method according to claim 29 comprising calculating a jump airtime by taking a difference between the landing time and the takeoff time, wherein the output signal indicates the jump airtime.

31. A method according to claim 28 comprising determining a time period during which the head angular velocity indicates downward head tilting, detecting a landing when the time period exceeds a landing time threshold, and determining a landing time comprising a midpoint of the time period.

32. A method according to claim 27 wherein the gyroscope is configured to produce angular velocity signals about three generally perpendicular axes, the method comprising:
   detecting a jump takeoff;
   detecting a jump landing;
   integrating the angular velocity signals from the gyroscope between the jump takeoff and the jump landing to determine rotations about the three generally perpendicular axes; and,
   generating a jump output signal comprising spin information based on the determined rotations.

33. A method of determining one or more jump parameters of a user of a head mounted information system comprising a gyroscope mounted on a frame configured to be worn by the user, the gyroscope configured to produce angular velocity signals representing a head angular velocity about a generally horizontal axis oriented generally perpendicular to a direction the user is facing when the user is wearing the frame, the method comprising:
   transforming the angular velocity signals from a time domain into a frequency domain;
   monitoring the head angular velocity to determine a first peak angular velocity and a second peak angular velocity;
   calculating a head angular acceleration by taking a derivative of the head angular velocity,
   detecting a jump occurrence when a peak in frequency domain angular velocities occurs above a jump frequency threshold, the head angular velocity indicates upward head tilting exceeding a first jumping angular velocity threshold, the head angular acceleration indicates upward head tilting exceeding an angular acceleration threshold and an absolute value of a sum of the first and second peak angular velocities exceeds a second jumping angular velocity threshold; and,
   providing an output signal to the user indicating the jump occurrence.

34. A method according to claim 33 comprising determining a takeoff time based on a time at which the peak in frequency domain angular velocities occurs.

35. A method according to claim 33 comprising detecting a landing when a second peak in frequency domain angular velocities occurs above the jump frequency threshold.

36. A method according to claim 35 comprising determining a landing time based on a time at which the second peak in frequency domain angular velocities occurs.

37. A method according to claim 33 wherein the jump frequency threshold is 40Hz.

* * * * *